(12) United States Patent
Chen et al.

(10) Patent No.: US 11,137,894 B1
(45) Date of Patent: Oct. 5, 2021

(54) OPTIMIZING CONTENT LAYOUT ON A FOLDABLE DEVICE

(71) Applicant: MICROSOFT TECHNOLOGY LICENSING, LLC, Redmond, WA (US)

(72) Inventors: Liang Chen, Redmond, WA (US); Mikalai Andreyanau, Mill Creek, WA (US); Rudy Huyn Van Phuong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/885,208

(22) Filed: May 27, 2020

(51) Int. Cl.
| | |
|---|---|
| *G06F 3/0487* | (2013.01) |
| *G06F 1/16* | (2006.01) |
| *G06F 9/451* | (2018.01) |
| *G06F 3/0483* | (2013.01) |
| *G06F 3/0485* | (2013.01) |

(52) U.S. Cl.
CPC .......... *G06F 3/0487* (2013.01); *G06F 1/1641* (2013.01); *G06F 1/1681* (2013.01); *G06F 3/0483* (2013.01); *G06F 3/04855* (2013.01); *G06F 9/451* (2018.02)

(58) Field of Classification Search
CPC ...... G06F 3/0487; G06F 9/451; G06F 1/1681; G06F 3/04855; G06F 3/0483; G06F 1/1641
See application file for complete search history.

(56) References Cited

U.S. PATENT DOCUMENTS

| | | | |
|---|---|---|---|
| 8,307,296 B2 | 11/2012 | Mackinlay et al. | |
| 8,803,816 B2 | 8/2014 | Kilpatrick et al. | |
| 10,528,359 B2 | 1/2020 | Klein et al. | |
| 2012/0319943 A1 | 12/2012 | Tamura | |
| 2013/0082901 A1* | 4/2013 | Watanabe | G09G 3/3666 345/1.3 |
| 2013/0215041 A1* | 8/2013 | Kim | G06F 3/0346 345/173 |

(Continued)

OTHER PUBLICATIONS

"Building Apps for Foldables", Retrieved from: https://web.archive.org/web/20190904030215/https://developer.android.com/guide/topics/ui/foldables, Sep. 4, 2019, 10 Pages.

(Continued)

*Primary Examiner* — Stephen G Sherman
(74) *Attorney, Agent, or Firm* — Newport IP, LLC; Jacob P. Rohwer

(57) ABSTRACT

A foldable computing device with multiple display regions repositions UI components of an application. A repositioned UI component may be easier to access, discover, and manipulate. In some configurations, a UI component is repositioned to be closer to the thumbs of a user holding the device. In other configurations, a UI component is repositioned to avoid inter-region gestures. In other configurations, a UI component is repositioned to a location that is less likely to move or shift the device by the physical force of touching the component. A content optimization engine may determine whether to reposition a UI component based on a number of factors, including a posture of the device, a size of the component, a complexity of user interaction needed to use the component, how often the component is used, etc.

19 Claims, 20 Drawing Sheets

(56) References Cited

U.S. PATENT DOCUMENTS

| | | | | |
|---|---|---|---|---|
| 2016/0098189 | A1* | 4/2016 | Goertz | G06F 3/04886 715/703 |
| 2017/0185289 | A1* | 6/2017 | Kim | G06F 1/1641 |
| 2020/0125144 | A1 | 4/2020 | Chung et al. | |
| 2020/0125194 | A1 | 4/2020 | Jiang et al. | |
| 2020/0126519 | A1* | 4/2020 | Heo | G06F 3/04842 |
| 2020/0264659 | A1* | 8/2020 | Kim | G06F 3/04845 |

OTHER PUBLICATIONS

"How Dynamic Layout can be Used to Boost Personalisation in the Travel Industry", Retrieved from: https://branchspace.com/personalising-the-ui-airlines/, Jun. 21, 2019, 9 Pages.

Craig, "Introducing Dual-screen Layouts for Android", Retrieved from: https://devblogs.microsoft.com/surface-duo/introducing-dual-screen-layouts-android/, Mar. 26, 2020, 6 Pages.

Simons, Hadlee, "This Might be the Future of Dual-screen Apps on Android", Retrieved from: https://www.androidauthority.com/microsoft-surface-duo-dual-screen-android-1076956/, Jan. 23, 2020, 4 Pages.

Warren, Tom, "This is Microsoft's Vision for Dual-screen Apps on Windows 10X and Android", Retrieved From: https://www.theverge.com/2020/1/22/21077334/microsoft-dual-screen-apps-windows-10x-android-emulator-surface-duo-neo-developers, Jan. 22, 2020, 5 Pages.

"International Search Report and Written Opinion Issued in PCT Application No. PCT/US2021/023375", dated Jul. 6, 2021, 26 Pages.

\* cited by examiner

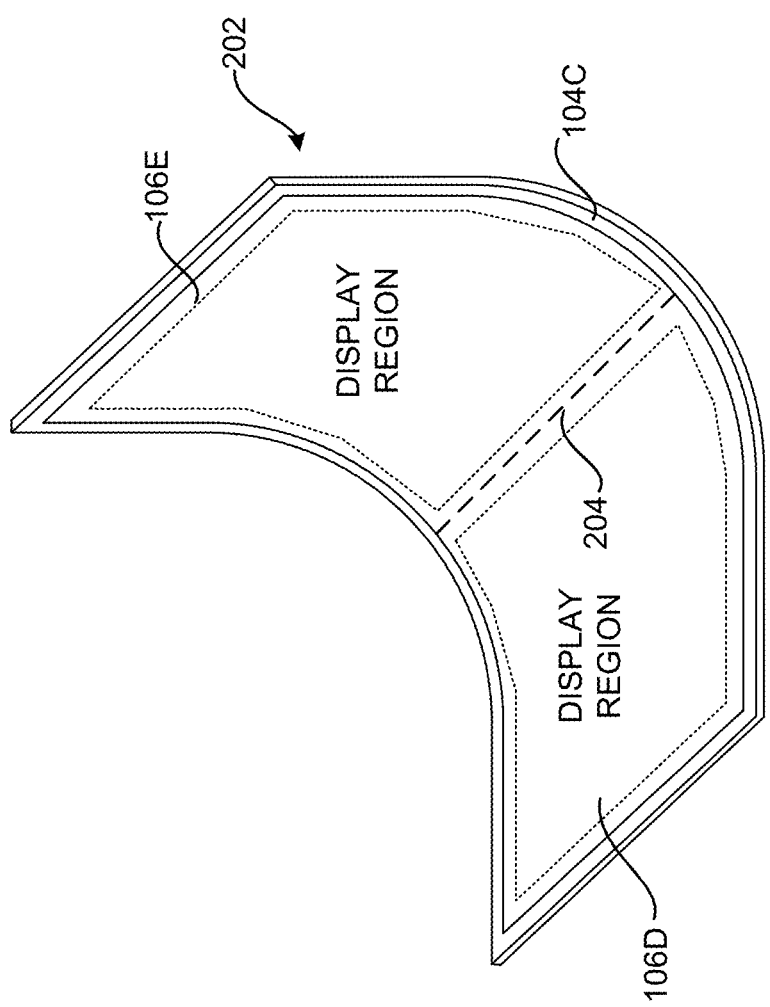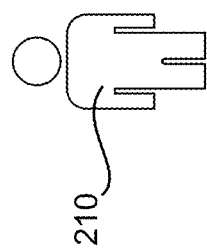
FIG. 2C

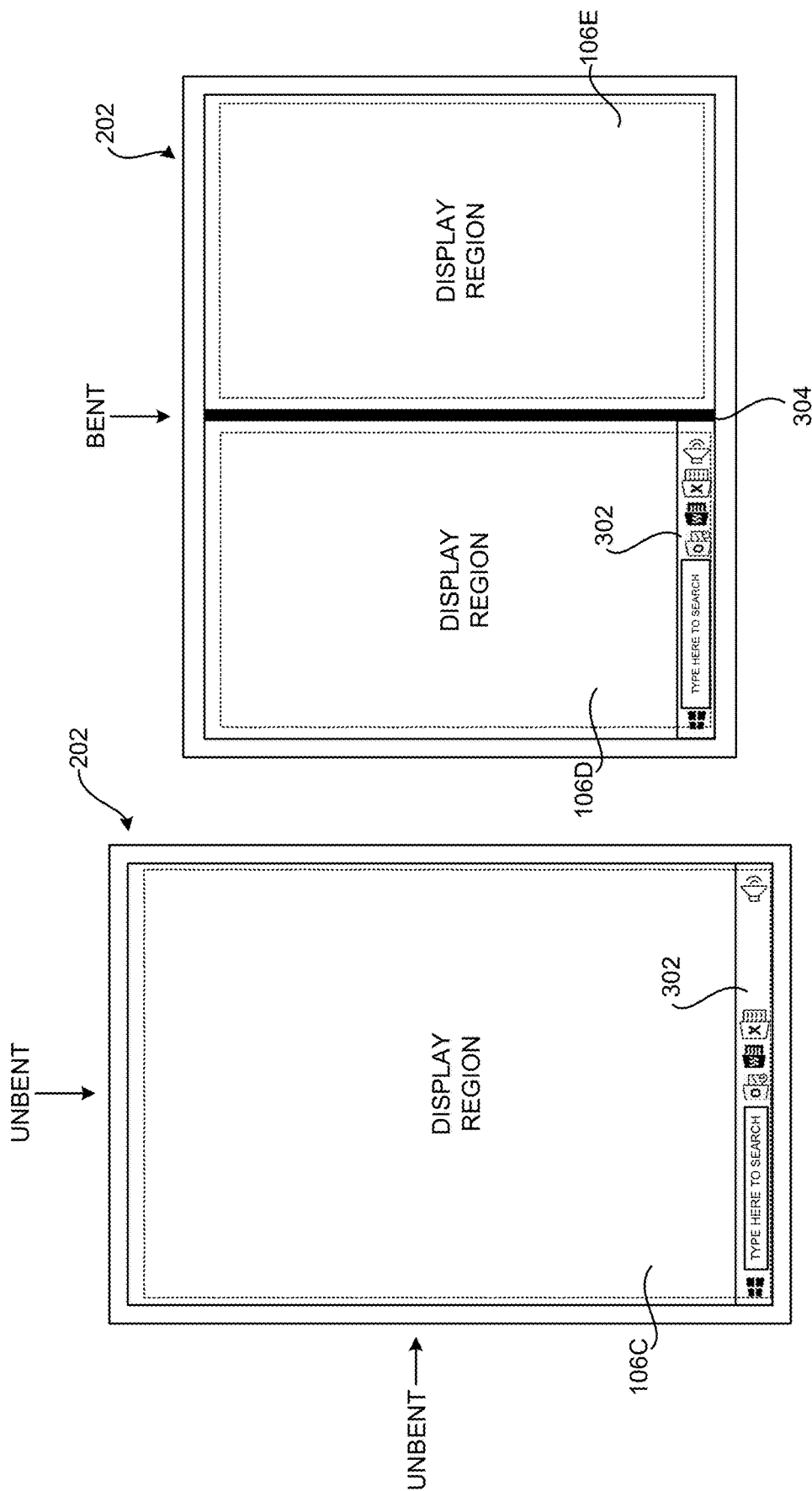

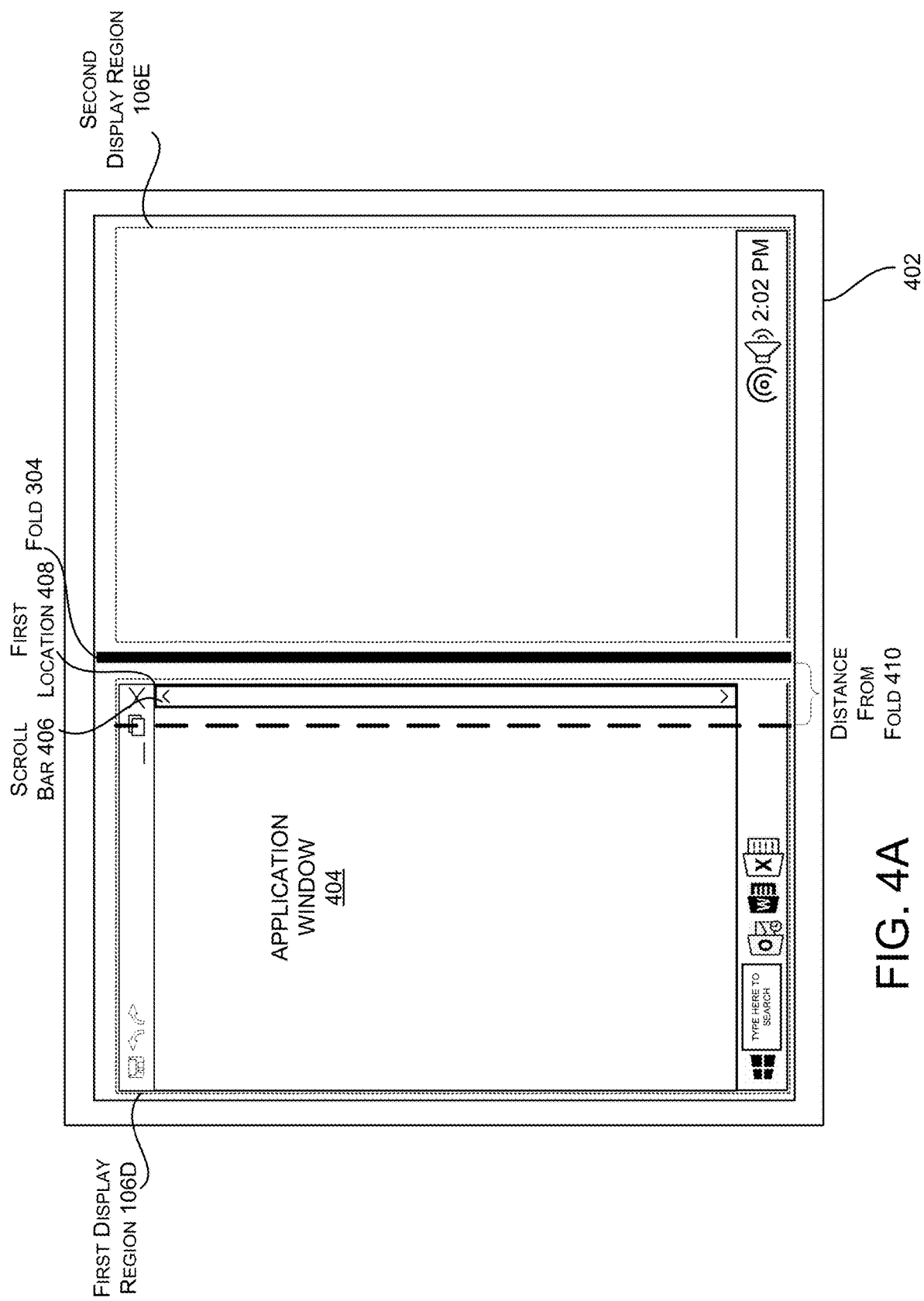

OPTIMIZING CONTENT LAYOUT ON A FOLDABLE DEVICE

BACKGROUND

Foldable computing devices include devices with two screens joined with a hinge or devices with bendable screens. These types of devices can provide benefits over traditional computing devices such as laptop computers. Commonly, however, these devices implement user interface ("UI") paradigms originally designed for computing devices with traditional form factors. As a result, UIs provided by foldable computing devices can be cumbersome and error-prone, which can lead to incorrect, inefficient, or inadvertent user input and unnecessary consumption of computing resources.

It is with respect to these and other technical challenges that the disclosure made herein is presented.

SUMMARY

Technologies are disclosed herein for optimizing content layout on a foldable device. The disclosed technologies address the technical problems described above by enabling foldable computing devices with multiple display regions to reposition UI components of an application. A repositioned UI component may be easier to access, discover, and manipulate. In some configurations, a UI component is repositioned to be closer to the thumbs of a user holding the device, e.g. away from a hinge that connects two display regions. In other configurations, a UI component is repositioned to avoid inter-region gestures, e.g. by resizing and moving a scrollbar to fit into a single display region. In other configurations, a UI component is repositioned to a location that is less likely to move or shift the device by the physical force of touching the component, e.g. by moving the UI component closer to the hinge. A content optimization engine may determine whether to reposition a UI component based on a number of factors, including a posture of the device, a size of the component, a complexity of user interaction needed to use the component, how often the component is used, etc.

Through implementations of the disclosed technologies, UIs can be provided by foldable devices that are easier to utilize and that result in fewer user input errors. Additionally, the utilization of computing resources by foldable computing devices can be reduced by avoiding the processing associated with inefficient navigation of a UI and inadvertent or incorrect user input. Other technical benefits not specifically mentioned herein can also be realized through implementations of the disclosed subject matter.

In some configurations, a foldable computing device includes a first display region physically connected to a second display region by a fold. The foldable computing device receives a request to display an application window in one of the display regions. The application window may include a user interface component at a first location, such as a button, a scroll bar, a dialog box, etc. The foldable computing device determines if the user interface component is located within a defined distance of the fold. If the user interface component is located within the defined distance of the fold, the user interface component may be relocated, e.g. away from the fold.

In some configurations, the foldable computing device determines whether to relocate a UI component based on a relocation score. The relocation score may be computed based on a number of factors, including a size of the UI component, a complexity of a UI gesture used to operate the UI component, distance to the fold, angle of the foldable device, etc. The foldable computing device will then relocate the UI component when the relocation score exceeds a defined minimum relocation score.

In some configurations, the relocation score for the user interface component is inversely proportional to the size of the user interface component. This reflects the idea that a smaller UI component is more difficult to manipulate, and so there is more reason to relocate a UI component that is difficult to manipulate away from the fold and towards a more easily accessible location. The relocation score for the user interface component may also be proportional to the complexity of the user interface gesture used to operate the user interface component. This reflects the idea that a more complicated UI gestures is more easily and more accurately made away from the fold, where finger dexterity is reduced due to having to stretch to reach the location, and due to the ease with which the other display region can be inadvertently invoked.

In some configurations, the relocation score is proportional to a measure of how often the user interface component has been used in the past. This reflects the idea that a frequently used UI component would benefit more from being relocated than a UI component that is rarely if ever activated. The measure of how often a UI component has been used in the past may be a per-user measure or an aggregate measure from multiple users.

In some configurations, the foldable computing device computes a fold angle between the display regions. The measured fold angle may also be a factor in determining whether to relocate the UI component. In general, the lower the fold angle—i.e. the closer the foldable computing device is to being closed—the more difficult it is to manipulate a UI component near the fold. As such, the foldable computing device may relocate a UI component if the UI component is within a defined distance of the fold and if the fold angle is less than a defined number, e.g. 140 degrees. If the fold angle is even less, e.g. 90 degrees, the defined distance may be increased.

In some configurations, the foldable computing device determines a posture of the foldable computing device based in part on the fold angle. Examples of postures include "flat", "book", "tent", "brochure", etc. Posture may be also be based on orientation of the foldable computing device— e.g. how the foldable computing device is oriented with respect to a user. The posture of a device may indicate how the device is being used, in addition to the physical position and orientation of the device. As such, posture, in addition to or as an alternative to fold angle, may affect the defined distance to the fold. For example, a "flat" posture may have a smaller distance to the fold than a device in a "book" posture, reflecting the idea that someone holding the device as a book may have more difficulty manipulating a UI component near the fold than a person using the device as it lays flat on a table.

In some configurations, the application window positions the UI component using a layout. A layout is a description of UI components and their positions and sizes on the application window. When it is determined that a UI component should be moved, a secondary layout may be used to determine where to move the UI component to. The secondary layout may be provided by the application window itself, e.g. by a programmer or designer that created the application window. In other scenarios, the secondary layout may be inferred based on the type of UI component being moved.

In some configurations, the foldable computing device determines that a posture of the foldable computing device has changed. In response to detecting this change, the foldable computing device may re-evaluate whether the UI component should be moved. The device may recompute all of the factors of the relocation score while making this determination.

In some configurations, the foldable computing device moves the application window to the second display region. For example, the foldable computing device may move the application window in response to a user command that drags and drops the application window to the other display region. Since the application window has been moved, the location of the UI component with respect to the fold has changed. For example, a UI component that was on the left side of the application when the application was in the left display region was far from the fold. However, upon moving the application to the right display region, the same UI component becomes close to the fold. As such, the foldable device may re-determine if the user interface component has been moved within a defined distance to the fold. If this is the case, the foldable computing device may relocate the UI component to a third location—e.g. to the right side of the application window. In some cases, this will result in the UI component again being located in the first location.

As discussed briefly above and in more detail below in conjunction with FIGS. 1-3, the foldable computing device may assume different postures based on the fold angle, the orientation of the device, etc. Some postures are physically stable when the device is laid on a surface. For example, a flat posture is secure when the device is laid on a flat surface, such as a table. A brochure postures is also stable, although less so than a flat posture, as the device may tip over. However, some postures, such as the compose mode, rely on the fold to hold one of the display regions into position. As such, pressing on the distal end of the display region being held in place by the fold may tip the device over, or unintentionally cause the fold angle to change.

To avoid this, in some configurations, when the foldable computing device detects it is in a posture that is not inherently stable, and the UI component is located on a display region that is not supported physically but is held in place by the fold, the device relocates the UI component away from the distal end of a display region that is held in place by the fold. For example, the device may relocate a UI component towards the fold. In this way, the torque applied to the device when the UI component is pressed is reduced in proportion to how far the UI component was moved. In some configurations, the foldable computing device determines if a UI component is within a defined distance of the distal end, e.g. if the UI component is in the half of the display region furthest from the fold. The UI component may often be moved towards the fold, but not so close as to be difficult to manipulate for reasons discussed herein.

In some configurations, the same techniques applied to foldable devices as discussed herein may also be applied to a non-foldable device in a two-region mode. For example, a user of a tablet computing device may not be able to easily manipulate a scroll bar located in the center of the display. For example, if a scroll bar is positioned on a right side of an application, and the application is located in the left region of a tablet device, the scroll bar may hard to reach, even if there is no fold to speak of. In these scenarios, the scrollbar may be moved to the left side of the application, enabling a user to manipulate the scrollbar with less effort. For example, if the user is holding the tablet with two hands, the user may already have a thumb near the edge of the device where the scrollbar was relocated.

In some configurations, a foldable computing device displays an application window that spans both display regions. For example, an application may take up some or all of a first display region and a second display region of the foldable computing device. At the same time, a UI component of the application window may also span both display regions. However, depending on device posture, it may be more or less convenient to manipulate a UI component across display regions. As such, the foldable computing device may determine, based on device posture, orientation, and other factors, to resize and/or relocate the UI component to a single display region. For example, the device may resize a scrollbar to fit in a single display window, and relocate the scrollbar to only be displayed in one of the two display regions. Even though the scrollbar has been relocated to a single display region, manipulations of the scrollbar will still cause content in both display regions to be scrolled.

In some postures, a UI component that spans multiple display regions may be easily manipulated or otherwise used. For example, in a flat posture, a scrollbar may be effectively by holding and swiping across both display regions. However, postures in which the fold angle deviates from 180 degrees—i.e. postures that are not flat—may make inter-region manipulations awkward. As such, if the foldable device detects that the posture has changed from flat to a non-flat posture, the foldable device may analyze the application for UI components that could benefit from being resized and/or relocated to a single display region.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIGS. 2A-2C are device posture diagrams illustrating aspects of the configuration and operation of a bendable computing device that implements the disclosed technologies in one particular configuration;

FIGS. 3A and 3B are device user interface diagrams illustrating various adaptations for multiple screen modes of bendable devices, according to one embodiment disclosed herein;

FIG. 4A is a block diagram illustrating an application window with a UI component within a defined distance of a fold of a foldable computing device.

DETAILED DESCRIPTION

Figure 1B:
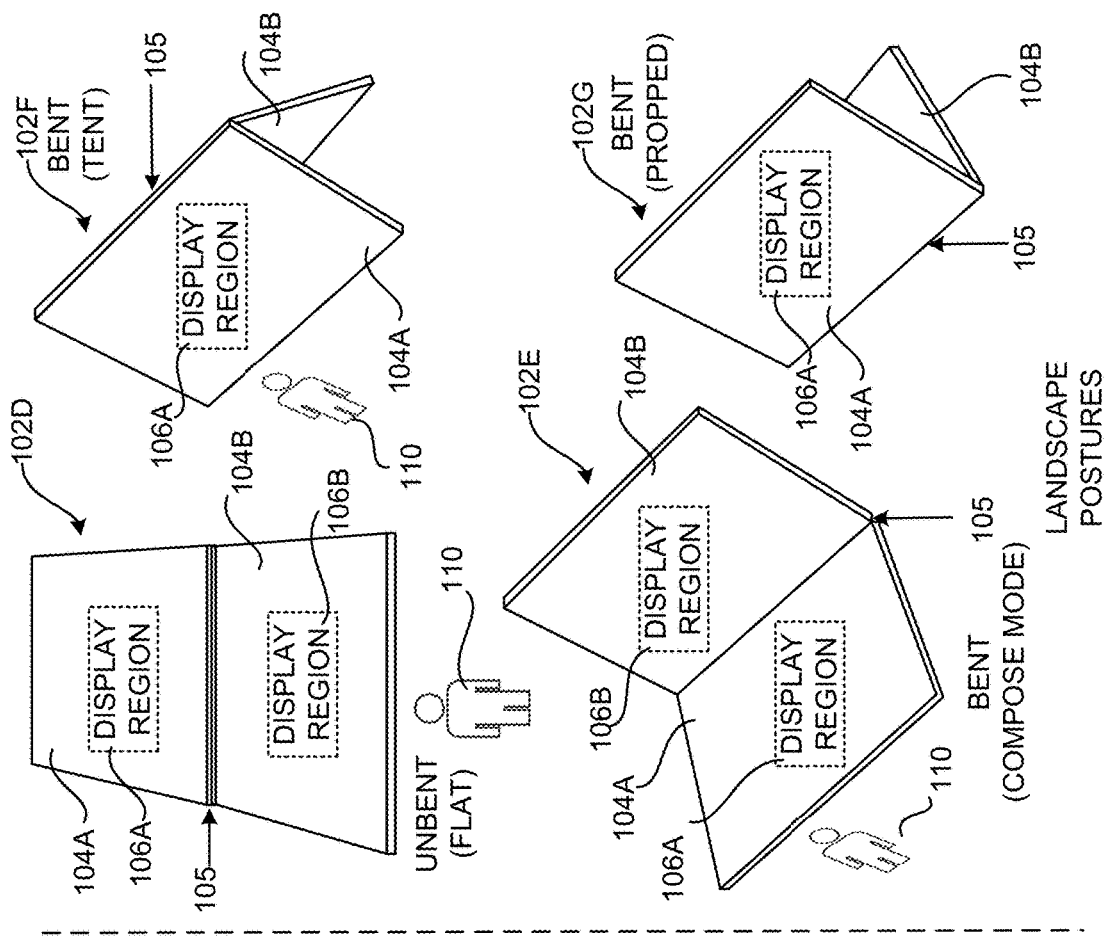
FIGS. 1A and 1B are device posture diagrams illustrating aspects of the configuration and operation of a hinged computing device that implements the disclosed technologies in one particular configuration.

The following detailed description is directed to technologies for optimizing content displayed on a foldable device. As discussed briefly above, implementations of the disclosed technologies can enable UIs to be provided that are easier to utilize and that result in fewer user input errors. Consequently, the utilization of computing resources can be reduced by avoiding the processing associated with inefficient navigation of a UI and inadvertent or incorrect user input, as compared to previous solutions. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for optimizing content displayed on a foldable device will be described.

Prior to discussing particular aspects of the disclosed technologies, a brief introduction to foldable computing devices (which might be referred to herein as "foldable devices") will be provided. As discussed briefly above, foldable devices include multiple screen form factor devices (which might be referred to herein as "hinged devices") that have two physical display screens joined together with a hinge or other equivalent mechanism. By manipulating the angle of the display screens with respect to one another by way of the hinge, such devices can be configured in a multitude of postures, some of which are described in greater detail below with regard to FIGS. 1A and 1B.

Foldable devices also refer to computing devices having a bendable display screen (which might be referred to herein as "bendable devices"), such as computing devices utilizing flexible screen technology. When such a device is not bent, it presents a single display surface. When bent, these devices present a single display surface with a crease in the middle. Bendable devices can also be configured in a multitude of postures by varying the amount of bend, some of which are also described in greater detail below with reference to FIGS. 1A and 1B.

The display screens of foldable computing devices can be touch sensitive, thereby enabling such devices to recognize touch or stylus input, presses, swipes, and other types of gestures, some of which are described below. These devices can also, of course, be used while being held in various orientations, some of which are described below with regard to FIGS. 1A and 1B.

Figure 1A:
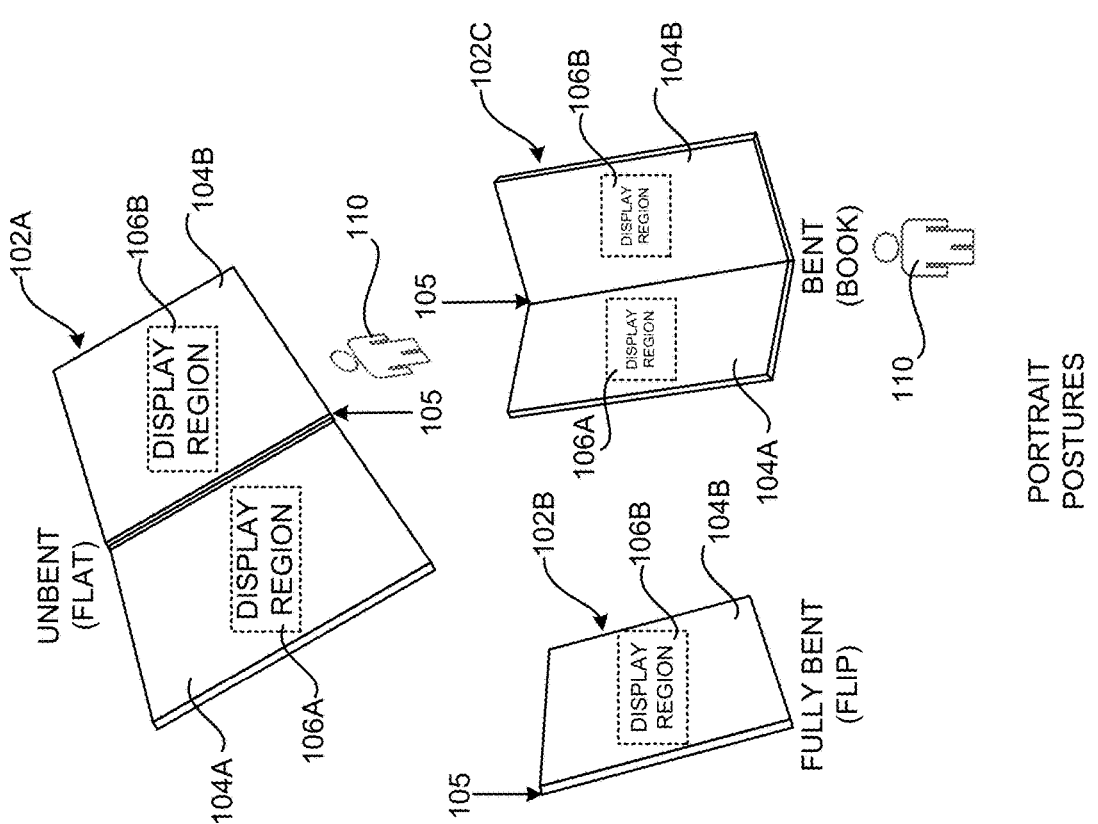

Referring now to FIGS. 1A and 1B, details regarding several postures for hinged display devices will be described. A hinged device 102 can be configured in multiple postures by varying the angle of the hinge 105 that connects two display devices 104A and 104B (which might be referred to herein as "displays") and by varying the orientation of the device with regard to a user 110. The examples shown in FIGS. 1A and 1B illustrate some possible postures for a hinged device 102. It is to be appreciated, however, that the illustrated postures generally apply to bendable devices as well.

In FIG. 1A, for instance, hinged device 102A is shown in an unbent posture, also referred to as a "flat" posture, where the display screens 104A and 104B are co-planer or near co-planer to one another. In some configurations, the fold angle of a flat posture is between 141-235 degrees. When the fold angle is between 175 and 185 degrees, hinged device 102A may be considered to be in a "completely flat" posture. A completely flat posture may be observed when the device 102A is laid on a flat surface, such as a table.

Hinged device 102A is depicted in a double-portrait orientation with respect to user 110. Double portrait orientation occurs when the displays 104 are to the left and right of the hinge 105 from the perspective of the user 110. Hinged devices 102B and 102C of FIG. 1A also are in double-portrait orientations. Double-portrait orientation contrasts with double-landscape orientation, in which the display 104 are above and below the hinge 105 from the perspective of the user 110. FIG. 1B depicts hinged devices 102D-102G in double-landscape orientations.

Hinged device 102B depicts a "fully bent" posture, also referred to as a "flip" posture, where a single display 104B is visible on one side of the hinged device 102B while the other display 104A is displayed on the other side of the hinged device 102B. In some configurations, the fold angle of a flip posture is between 346 and 360 degrees. Hinged device 102C depicts a "bent" posture, also referred to as a "book" posture. In some configurations, the fold angle of a book posture is between 141 and 235 degrees.

The hinged device 102 can also be configured in a closed posture (not shown) where neither display screen 104 is visible. In some configurations, the fold angle of a closed posture is between 0 and 5 degrees. Also not shown is a brochure posture, having a fold angle between 235 and 345 degrees, in some configurations. The brochure posture has a fold angle greater than "book" posture (76-140 degrees) but less than "flip" posture (346+ degrees). Also not shown are "peek left" and "peek right" postures, which have fold angles between 6 and 75 degrees. The device 102 is in a "peek left" posture when the hinge 105 is on the left from the perspective of the user 110, while the device 102 is in a "peek right" posture when the hinge 105 is on the right from the perspective of the user 110.

In FIG. 1B, the hinged device 102D is shown in a flat, "unbent" posture, similar to hinged device 102A, in which the display screens 104A and 104B are co-planer or nearly co-planer to each other. The "flat" posture of hinged device 102D is similar to the "flat" posture of hinged device 102A, but in a different orientation. Specifically, hinged device 102D is in a "double landscape" orientation with respect to the user 110.

Hinged device 102E illustrates another posture with "double landscape" orientation—"compose mode". In some configurations, "compose mode" is a posture with a fold angle between 80 and 140 degrees. While in a "compose mode" posture, the hinged device 102E often may be laid flat, e.g. display 104A may be laid flat on a table or in a user's lap, while display 104B may be held in place at an angle by hinge 105. This forms a configuration similar to a traditional laptop computer, and may be effective for content creation. While in a "compose mode" posture, display region 104A of hinged device 102E may function as a soft keyboard. In other configurations, a hardware keyboard may be overlaid on top of display 104A.

FIG. 1B also illustrates hinged devices 102F and 102G, which are in "tented" and "propped" postures, respectively. A "tent" posture, in some configurations, has a fold angle of 236 to 345 degrees, while a "propped" posture may have a fold angle of 270 to 335 degrees. "Tent" and "propped" postures have similar fold angles, but are differentiated by their orientation with respect to the ground. Hinged device 102F, which is "tented", rests on the edges of each display 104 that are opposite to the hinge 105. In contrast, hinged device 102G, which is "propped", rests on one of the display screens 104. While in the "propped" posture, hinged device 102G rests on the surface of display 104B that generates content, and as such, only allows one display, 104A, to effectively provide content. It is to be appreciated that the postures illustrated in FIGS. 1A and 1B are illustrative and that other postures might also be possible. It is also be appreciated that the specific angles and ranges of angles are exemplary, and that other ranges of angle for the postures listed are similarly contemplated.

As also shown in FIGS. 1A and 1B, the display device 104A provides a first display region 106A that encompasses all or a part of the display 104A. Similarly, the display device 104B provides a second display region 106B that encompasses all or a part of the display 104B. The first display region 106A and the second display region 106B can present graphical user interface ("GUI") elements, text, images, video, notifications, virtual buttons, virtual keyboards, messaging data, Internet content, device status, time, date, calendar data, preferences, map information, location information, application windows, and any other information that is capable of being presented in a visual form. Various uses of the display regions 106A and 106B provided by the hinged device 102 will be described below.

Display regions 106A and 106B may operate in a two-region mode in which each region displays at least one application window. A foldable device may be put into a two-region mode manually by a user, or automatically in response to attributes about the device. One example attribute is having entered a device posture commonly associated with displaying different application windows in different display regions, e.g. a book posture. Another example attribute is detecting two concurrently running applications that are commonly executed in a side-by-side workflow. In a two-region mode, application windows may be moved between the display regions, e.g. an email application may be moved from display region 106A to display region 106B. In some configurations, an application window located in a particular display region, e.g. display region 106A, fills the entire region. In other configurations, multiple application windows may be tiled, partially overlap, or otherwise be displayed concurrently in the display region 106A. In some configurations, while operating in a two-region mode, display regions 106A and 106B may not display different portions of a single application window—e.g. a single application may not be displayed across display regions 106A and 106B Display regions 106A and 106B may also operate in a single region mode, in which both display regions 106A and 106B together form a single display region, akin to display region 106C discussed below in conjunction with FIG. 2. In these configurations, an application may be displayed across both display regions 106A and 106B. A foldable device may be put into a one-region mode manually by a user, or automatically in response to attributes about the device. Some example attributes include device posture, e.g. having entered a perfectly flat posture, or detecting the launch of an application that utilizes both regions as a single region, such as a media viewing application.

Figure 2B:
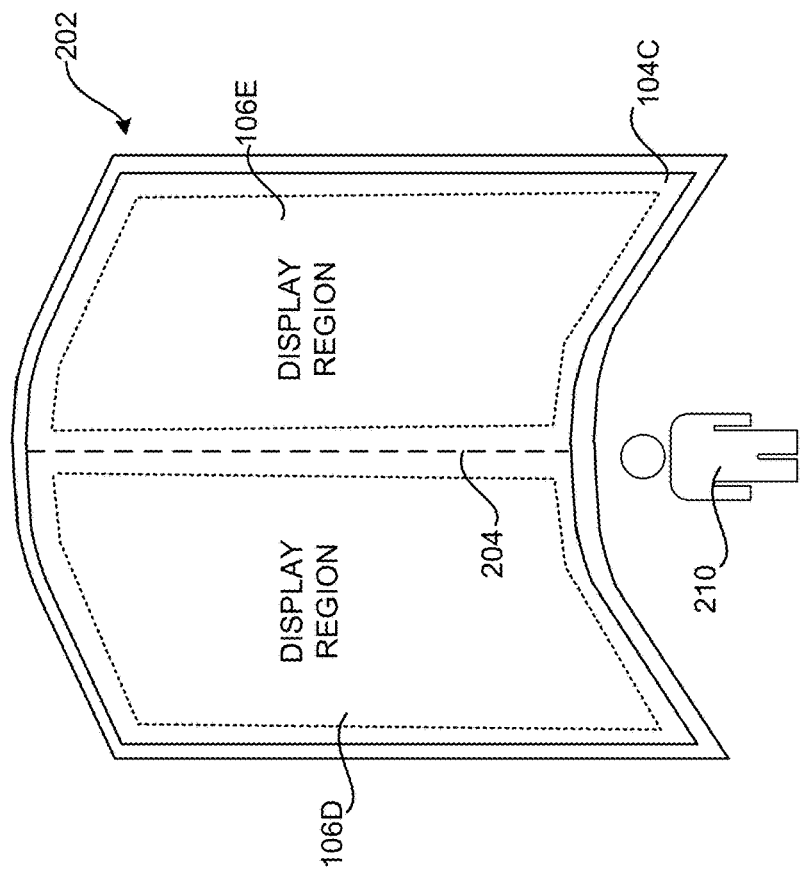
Figure 2A:
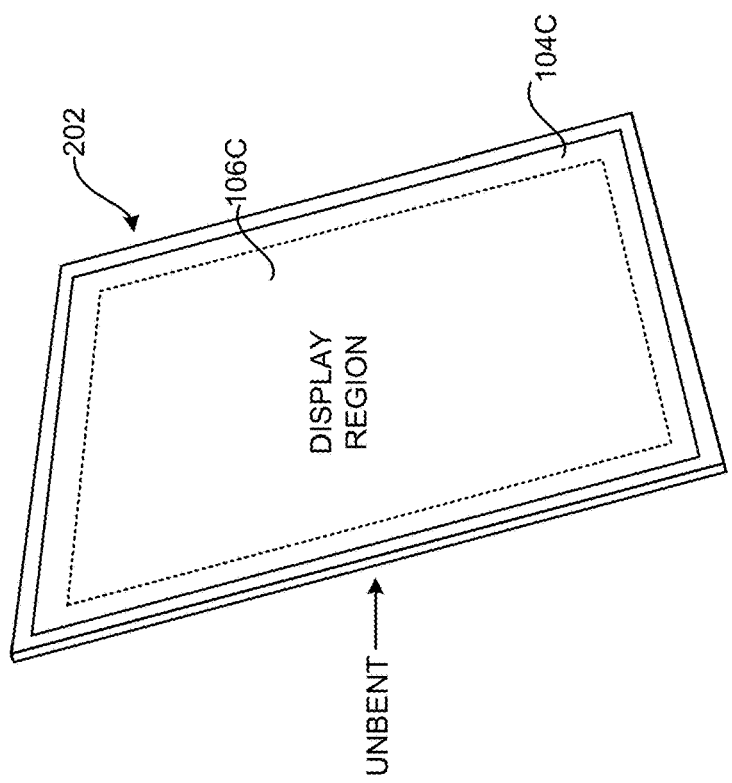

Referring now to FIGS. 2A and 2B, details will be provided regarding the configuration and operation of a bendable device 202. As mentioned above, a bendable device 202 can also be configured in postures the same as or similar to those described above with regard to FIGS. 1A and 1B. For instance, in the example posture shown in FIG. 2A, the bendable device 202 has been placed in an unbent position, thereby presenting the entirety of the display 104C.

The bendable device 202 can also be configured in a closed posture where neither display region is visible.

In the example posture shown in FIGS. 2B and 2C, the bendable device 202 has been partially bent similar to the partially open posture shown in FIGS. 1A and 1B. In particular, in the example shown in FIG. 2B, the bendable device 202 has been bent while the screen 104C is in a landscape orientation from the perspective of a user 210. Even though the screen 104C is in a landscape orientation, when foldable device 202 is in a two-region mode, this posture may be referred to as having a "double portrait" posture type, because each of display regions 106D and 106E are in portrait mode from the perspective of the user 210. In the example shown in FIG. 2C, the device 202 has been bent while the screen 104C is in portrait orientation from the perspective of the user 210. While the screen 104C is in portrait orientation, when foldable device 202 is in a two-region mode, this posture may also be referred to as having a "double landscape" posture type, as each of the display regions 106D and 106E are in a landscape orientation from the perspective of the user 210.

When the bendable device 202 is bent, a crease 204 is formed in the display 104C. The term "fold" as used herein may refer to the crease 204 of a bendable device 202 or a hinge 105 of a hinged device 102.

As in the case of a hinged device 102, the bendable device 202 can provide multiple display regions 106. However, in the case of a bendable device 202, the number of available display regions can vary based upon the posture of the device. For instance, a single display region 106C is provided when the bendable device 202 is in an unbent state as shown in FIG. 2A. Two display regions 106D and 106E can be provided on the display 104C when the bendable device 202 is in a bent posture, such as that shown in FIG. 2B. Various details regarding the configuration and use of the display regions 106 (which are rendered using dotted lines throughout the FIGS.) provided by foldable devices are provided below.

Referring now to FIGS. 3A and 3B, details will be provided regarding various adaptations for multiple screen modes of bendable devices 202. It is to be appreciated that the bendable device 202 shown in FIGS. 3A and 3B (and FIGS. 4-7) have been shown two-dimensionally for ease of illustration. This is not, however, intended to indicate that the bendable device 202 is lying flat.

Prior to discussing FIGS. 3A and 3B and the other FIGS., it is also to be appreciated that certain relative terms (e.g. height, width, top, bottom, left, right) might be utilized herein to describe the configuration of the displays and display regions described herein. In this regard, it is to also be appreciated that these terms have been utilized herein for ease of discussion and are not to limit the configuration of the display regions or UI components. Other terms can be utilized to describe the displays, display regions, UI components, and their spatial relationships to one another. It is also to be appreciated that although generally described separately, the various embodiments described briefly above and in further detail below can be utilized in combination with one another.

As discussed briefly above, foldable devices can be manipulated between a portrait orientation as shown in FIG. 3A and a landscape orientation as shown in FIG. 3B. As also discussed above, these devices can be bent to various degrees by modifying the angle of a fold 304. In the case of a hinged device 102, fold 304 refers to the hinge 105. In the case of a bent device 202, fold 304 refers to the crease 204. In the case of a hinged device 102, the hinge 105 is typically visible from the front and rear of the device. Additionally, in both types of devices the fold 304 can be configured with a sensor capable of measuring the angle of bend of the fold 304 (i.e. the "fold angle") and providing data to a processor of the device that specifies the fold angle.

Similar to hinged device 102, the bendable device 202 is configured to dynamically transition between two region modes and single region modes based on the fold angle of the device 202 and other attributes. For example, and without limitation, a bendable device 202 might behave as if it has a single display screen and provide a single display region 106C when the device 202 is unbent. In this example, the display region 106C extends across the entirety of the display, including the area of the device 202 where the crease 204 would appear when bent.

A bendable device 202 might also support a two-region mode, providing multiple display regions 106D and 106E when the device 202 is bent. In the illustrated example, the display region 106D encompasses the entirety of the left side of the device 202 and the display region 106E encompasses the entirety of the right side of the device 202. If the device 202 is in an unbent posture and transitions to a bent posture, the device 202 will transition from single display region mode to two-region mode. Similarly, if the device 202 is in a bent posture and transitions to an unbent posture, the device 202 will transition from a two-region mode to a single region mode.

In one embodiment, an operating system presents a taskbar 302 across the bottom of the display screen of a bendable device 202. The taskbar 302 can provide various types of functionality including, but not limited to, launching applications, displaying notifications, displaying UI controls for configuring aspects of the operation of a device (e.g. changing the volume level), searching, viewing available applications, displaying the time, initiating a view of currently available windows, and others.

FIG. 4A is a block diagram illustrating an application window 404 with a UI component 406 within a defined distance 410 of a fold 304 of a foldable computing device 402. As illustrated, the UI component 406 is a scrollbar, but any other type of UI component, control, widget, window, dialog box, or other UI component is similarly contemplated.

As referred to herein, an application window refers to content displayed by an application executing on a computing device. An application window may be displayed in a single display region of a foldable computing device, or an application window may span multiple display regions. By spanning multiple display regions, the application is afforded more space to display content, with the drawback of a hinge, crease, or other type of fold in between the multiple display regions. Inter-region gestures may be difficult to perform due to the fold.

As referred to herein, the distance from fold 410 is measured by a number of pixels, points, inches, or any other unit of linear measurement. For example, the foldable computing device 402 may relocate a UI component if it is located within 48 pixels of the fold 304.

In some configurations, the distance from fold 410 is a constant value, as depicted by the straight dashed line in FIG. 4A. However, it is also contemplated that the distance from fold 410 may be non-constant, such that the portion of the display region from which a UI component may be relocated takes on a curved, wavy, irregular, or other shape. For example, the distance from fold 410 may be larger in the middle of the foldable device 402 than towards the edges of the foldable device 402, or vice-versa.

In some configurations, the UI component 406 is initially displayed at a first location 408. The first location 408 may be a default location chosen by a programmer or designer of the application window, or the first location 408 may be a default location provide by an operating system. In some scenarios, discussed in more detail below in conjunction with FIGS. 5A and 5B, the first location 408 of the UI component 406 may be defined as part of an application layout, also referred to as a template.

While reference throughout this document is primarily made to foldable devices—e.g. bendable and hinged devices, similar techniques may be applied to a device with a single display screen with fixed display regions. For example, an operating system of a tablet computer could define display regions 106A and 106B as adjacent regions on a single screen. The display regions would abut at a virtual fold, rather than a physical fold. An application may then be displayed in one of the display regions, and a UI component of that application may be relocated as described herein based on proximity to the virtual fold.

Figure 4B:
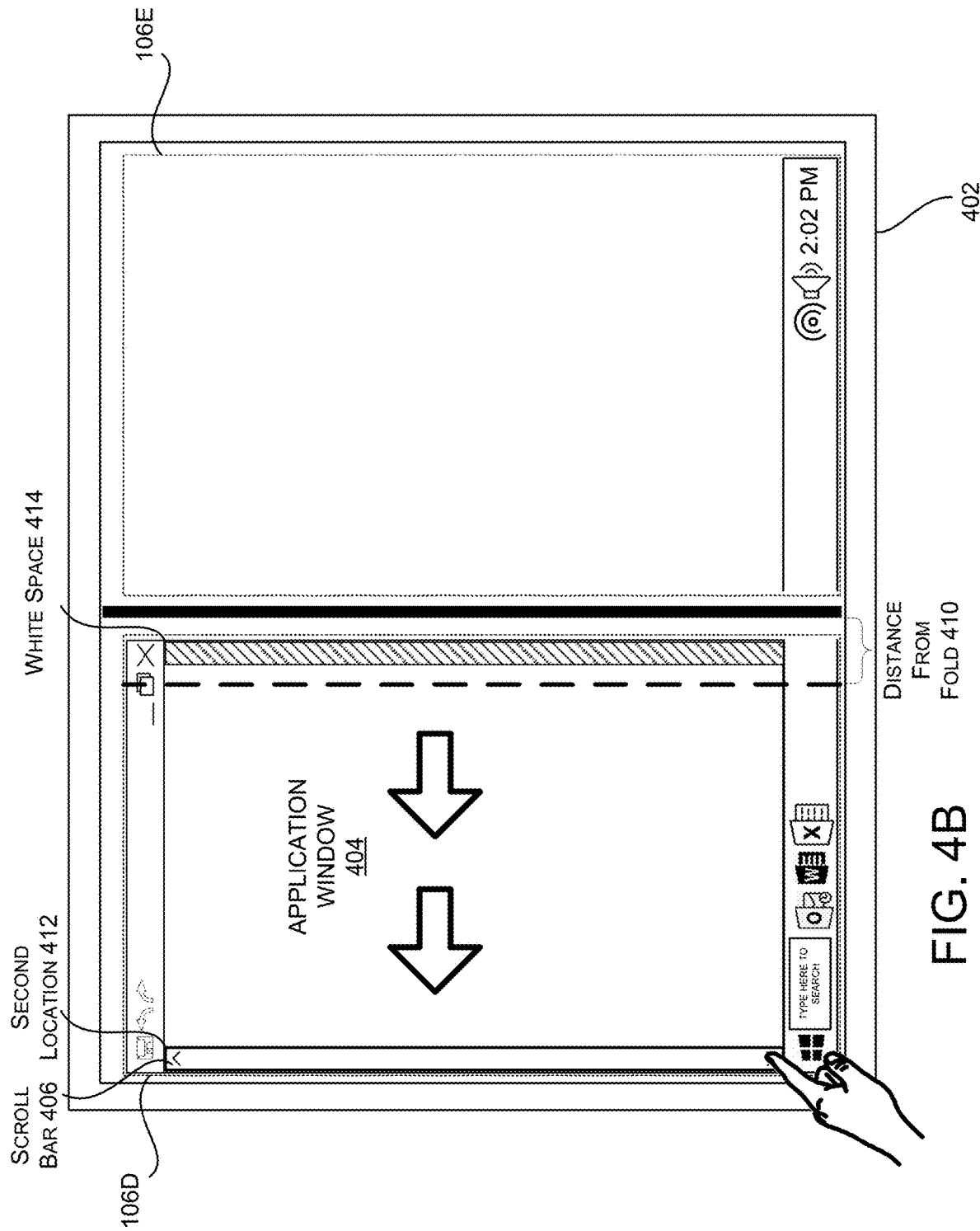
FIG. 4B is a block diagram illustrating an application window with a UI component that has been moved to a different location in the application window.

FIG. 4B is a block diagram illustrating the application window 404 in which the UI component 406 has been moved to a second location 412 in the application window 404. In some configurations, the second location 412 is a backup or secondary position defined by programmers and designers of the application window 404—i.e. the second location may be "hard-coded". In other configurations, the second location 412 may be determined dynamically, in response to factors detected while the application window 404 is running. For example, the second location 412 may be selected from a number of candidate second locations based on how much other content in the application window 404 would be moved to accommodate or occluded by the moved UI component 406. In some configurations, the second location 412 is selected by the operating system or a content optimization engine.

In some configurations, application window 404 may replace the first location 408 with whitespace. In other configurations, application window 404 may shift other content away from the second location 412 towards the first location 408, making room for the UI component at the new location by utilizing the portion of the display region left by the move.

Application window 404 may determine whether to relocate UI component 406 based on a number of factors, not limited to: the size of the component, the complexity of interaction needed to use the component, how often the component has been used historically, where the component is located with respect to the application window 404, where the application window 404 is located with respect to the foldable device—e.g. which display region or regions the application window is located on, whether the component is near the fold or other location which makes manipulating, reading, activating, or otherwise using the component difficult. Other factors in determining whether to relocate a UI component include device posture, device orientation, changes to device posture and/or device orientation, whether the device is being held, and if so, how it is being held, and the physical stability of the device, among others. Any or all of these factors may be combined into a composite score, which may be compared to a threshold score to determine whether to move the UI component 406.

For example, the size of the UI component 406 is one factor in determining whether to relocate the UI component 406. Generally speaking, the smaller a UI component is, the more difficult it is for a user to manipulate it—e.g. touch it, hold it, drag it, etc. As such, when a small component is located in a portion of a display region 106 that is difficult for a user to access, it is even more difficult for a user to manipulate the component. Conversely, large UI components are easier to activate, manipulate, and otherwise work with. As such, even if a large UI component is located near the fold or other portion of a display region that is difficult to access, the size of the component may make the UI component easy enough to manipulate that it isn't worth relocating.

In addition to the benefits of relocating a UI component—e.g. easier access to and manipulation of the component—there are also downsides to relocating a UI component 406 from a default location 408. For example, users may come to expect that a UI component will be placed in the default location. Moving the UI component may subvert that expectation, which can cause a poor user experience. Furthermore, changing the location of a UI component while an application is running may be jarring and confusing to users. As such, the benefit of moving a UI component away from the fold 304 or other inaccessible location may be outweighed by the downsides of the move.

Another factor considered when determining whether to relocate the UI component 406 is the complexity of interaction needed to utilize the component. Some UI components are read-only, e.g. a UI component that displays text, and as such perform their function without any user input. A read-only UI component is not subject to being mis-clicked, nor are read-only UI components more difficult to interact with due to proximity to the fold 304. Read-only UI components are thus associated with a lower relocation score, and as such are less likely to be relocated than other UI components that receive user input.

Some UI components accept basic input gestures. One basic input gesture is a "click" or "press". This gesture may activate the UI component, e.g. open a file, activate a command, or perform some other basic function. While more complex than a read-only UI component, simple button presses and other UI components with simple interactivity models are easier to operate than UI components that support more complex interactions. In this way, while a UI component that supports a simple form of UI interaction may be more likely to be relocated than a read-only UI component, it is less likely to be relocated than components utilizing more complex UI gestures.

A gesture's complexity increases with the number of touches, the duration of each touch (e.g. whether the touch requires a 'hold'), and any motion associated with the gesture (e.g. a 'click and drag'). One example of a UI component that supports a more complex user interface gesture is a scrollbar, e.g. scrollbar 406. A scrollbar may be manipulated using a sequence of "press, hold, and drag" inputs. Not only does utilizing a scrollbar in this manner require executing these gestures, but it requires executing them in sequence. A sequence of UI gestures is significantly more difficult for a user to perform than a single gesture (e.g. a button press). The difficulty of a complex UI gesture is compounded by proximity to the fold 304. Complex gestures performed near the fold 304 are even more prone than simple UI gestures to mistakenly touch the other display region, generating an unexpected input. As a result, the more complex a user interaction is, the higher the relocation score assigned to the UI component, making it more likely that the UI component 406 will be relocated.

Another factor used to compute a relocation score is how often the component has been used. A component that is used frequently may be assigned a higher relocation score, as it is more likely that a user will benefit from an easier to access and manipulate UI component. Usage history may be collected from the foldable computing device 402, from usage patterns of the user currently logged into the foldable computing device 402, or from a usage history of a larger number of users. Usage history may be based on the usage of the UI component 406 in the context of the specific application window 404, or in the context of other application windows. For example, the usage history of a scrollbar within a particular application may be considered, while in other circumstances, the usage history of all scrollbars in all applications may be considered.

Usage history may also be based on how often the UI component 406 is used while proximal to the fold 304 as compared to how often the UI component 406 is used while in an easier to access location. For example, foldable computing device 402 may determine that the UI component 406 is three times less likely to be activated when located within a defined distance of the fold than when located near a user's hand. In these circumstances, the relocation score of the UI component may be further increased.

Another factor used to compute a relocation score is where the component is located with respect to the application window 404. As illustrated, a determination is made whether the UI component 406 is within a defined distance 410 from the fold 304. In some embodiments, the UI component 406 is considered to be located within the defined distance if the entire UI component is within the defined distance 410. In other embodiments, the UI component may be considered within the defined distance if some percentage of the UI component is within the defined distance, e.g. 75% of the area of the UI component. In some configurations, the relocation score is proportional to the extent to which the UI component is within the defined distance from the fold 304. As referred to herein, when a relocation score of a UI component is proportional to a factor, the relocation score is computed as higher than it would be if the UI component did not have that factor. Similarly, as referred to herein, when a relocation score of a UI component is inversely proportional to a factor, the relocation score is computed as lower than it would be if the UI component did not have that factor.

Another factor used to compute the relocation score is where the application window 404 is located with respect to the foldable device 402—e.g. which display region or regions the application window is located in. Specifically, the relocation score may be increased if the application window 404 is within a defined distance of the fold 304 or other location which makes manipulating, reading, activating, or otherwise using the UI component 406 difficult. Conversely, if the application window is not near the fold 304, e.g. at a distal end of a display region 106, the relocation score of a UI component may be reduced.

Another factor used to compute the relocation score is device posture, orientation, and changes thereto. As discussed above in conjunction with FIGS. 1-3, device posture is determined based on a fold angle between the two display regions 106 and an orientation of the foldable computing device 402 with respect to a user. In some configurations, postures with smaller fold angles (i.e. that are closer to being closed completely, at which point neither display region 106 would be visible) are associated with higher relocation scores, as the more acute angle between the display regions makes accidentally touching the other display region more likely. Conversely, postures which have greater fold angles, e.g. "flat" or "brochure" postures, are associated lower relocation scores, as the risk of accidentally touching the other display region is lower.

Device posture may also affect the relocation score based on a likelihood that the foldable device is being held by the user. For example, a flat posture, often used to lay the foldable device on a table, may not often be held by a user in the hands. Since it is less likely that a user is manipulating the device, the user is less likely to benefit from relocating the UI component in order to manipulate the UI component. Therefore, the relocation score would be lower when the device is in a flat posture than if the device were in a posture in which the device is commonly held by a user.

In addition to determining whether the foldable device 402 is being held based on posture, the foldable device 402 may also determine whether it is being held based on data received from a gyroscope. Data from a gyroscope may indicate whether the device is in motion. If so, it is more likely that the device is being held by a user. Conversely, if the device is stationary, it is less likely that the foldable device 402 is being held by a user. Data from a touchscreen may also be used to determine whether or not a user's hands are placed on the foldable device 402. However it is determined that the foldable device 402 is being held by a user, a UI component may be assigned a higher relocation score than if it is determined that the device is lying stationary.

Any or all of the factors listed above may be used to generate a relocation score. In some configurations, whether to relocate UI component 406 is determined by comparing the relocation score to a predetermined minimum relocation score. The minimum relocation score may be user-defined, set by a programmer or designer of the application 404, or set by an operating system.

In some configurations, the distance 410 from the fold 304 is computed based on factors similar to the factors discussed above for determining the relocation score. For example, a factor that would increase the relocation score, making it more likely that the UI component 406 will be relocated, may also cause the distance from the fold to be increased, allowing more UI components to be subject to relocation. Some of these factors include device posture, whether the device is being held or lying flat, and any other factor that is device or application specific.

In some configurations, moving he UI component 406 to a different location leaves an empty region in the application 404. In some configurations, the first location 408 of the UI component is left blank after the component has been moved. In other configurations, the other content of application window 404 may be shifted over, utilizing some or all of the display region vacated by the move.

In some configurations, the second location 412 is defined by a backup, or secondary, layout of application window 404. The backup layout may be defined by a programmer or designer that created the application. In other configurations, specific types of UI components, e.g. scrollbars, may be relocated to well-defined locations. In the case of a scrollbar, the second location 412 is on an edge of the foldable device opposite the fold 304. The edge opposite the fold may be chosen due to the increased likelihood that the user is holding the device with that edge. However, this increased likelihood is subject to the posture of the foldable device. A foldable device in a "tented" posture may not expect a user's hand to be holding on to, or even close to, the edge opposite the fold 304. In some configurations, the foldable device may be configured to detect, via a touch sensor, whether the user's hand is actually holding the device. If a user's hand can be located on one of the edges of the device, that edge may be prioritized as the second location 412. Similarly, layouts that include the second location 412 along the edge held by a user's hand may also be prioritized.

Figure 4C:
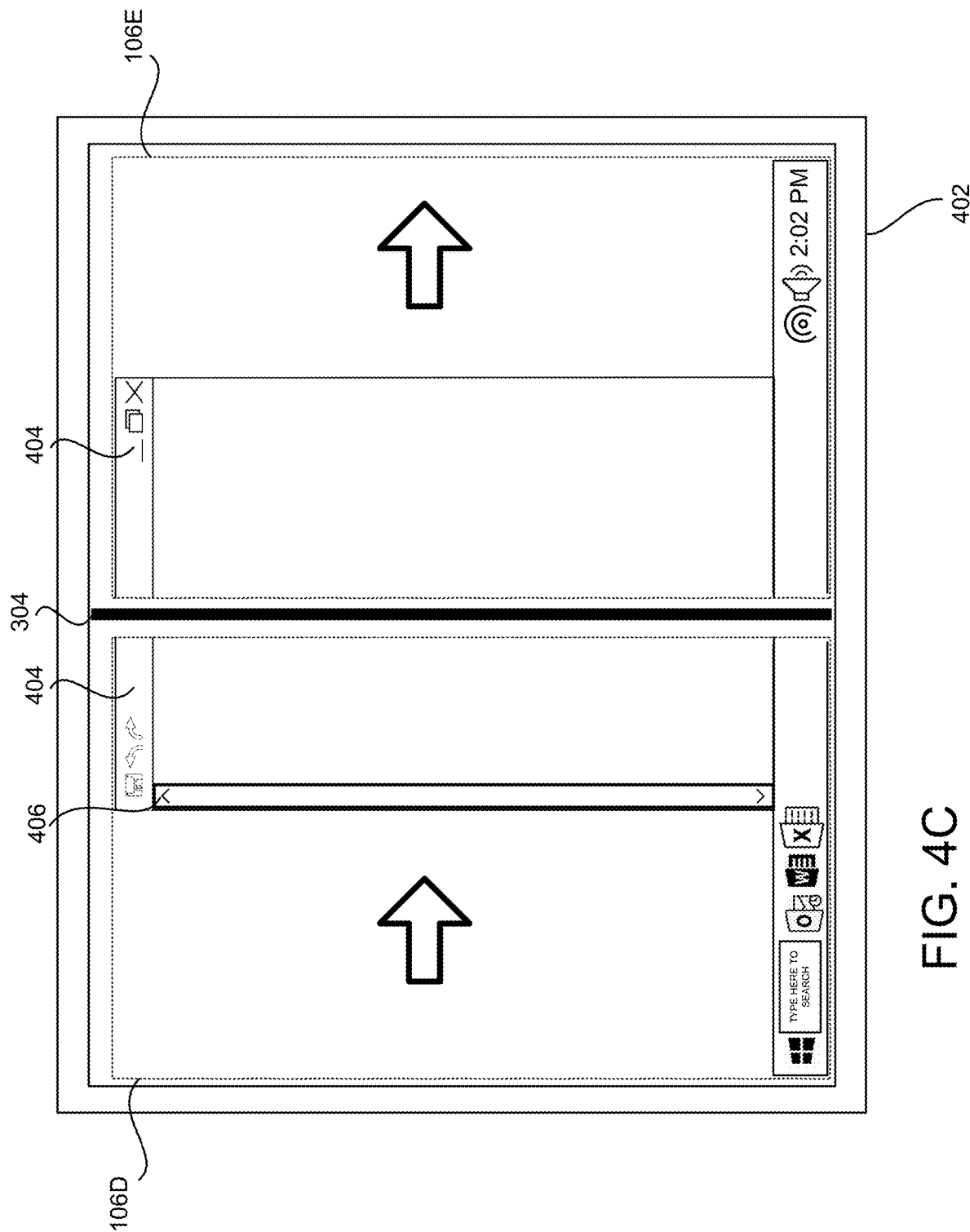
FIG. 4C is a block diagram illustrating an application window moving from one display region to another.

FIG. 4C is a block diagram illustrating an application window 404 moving from one display region 106D to another 106E. In some configurations, the application window 404 is moved in response to a user gesture, e.g. clicking and dragging on the title bar of the application window 404 and dragging the application window 404 towards display region 106E.

Figure 4D:
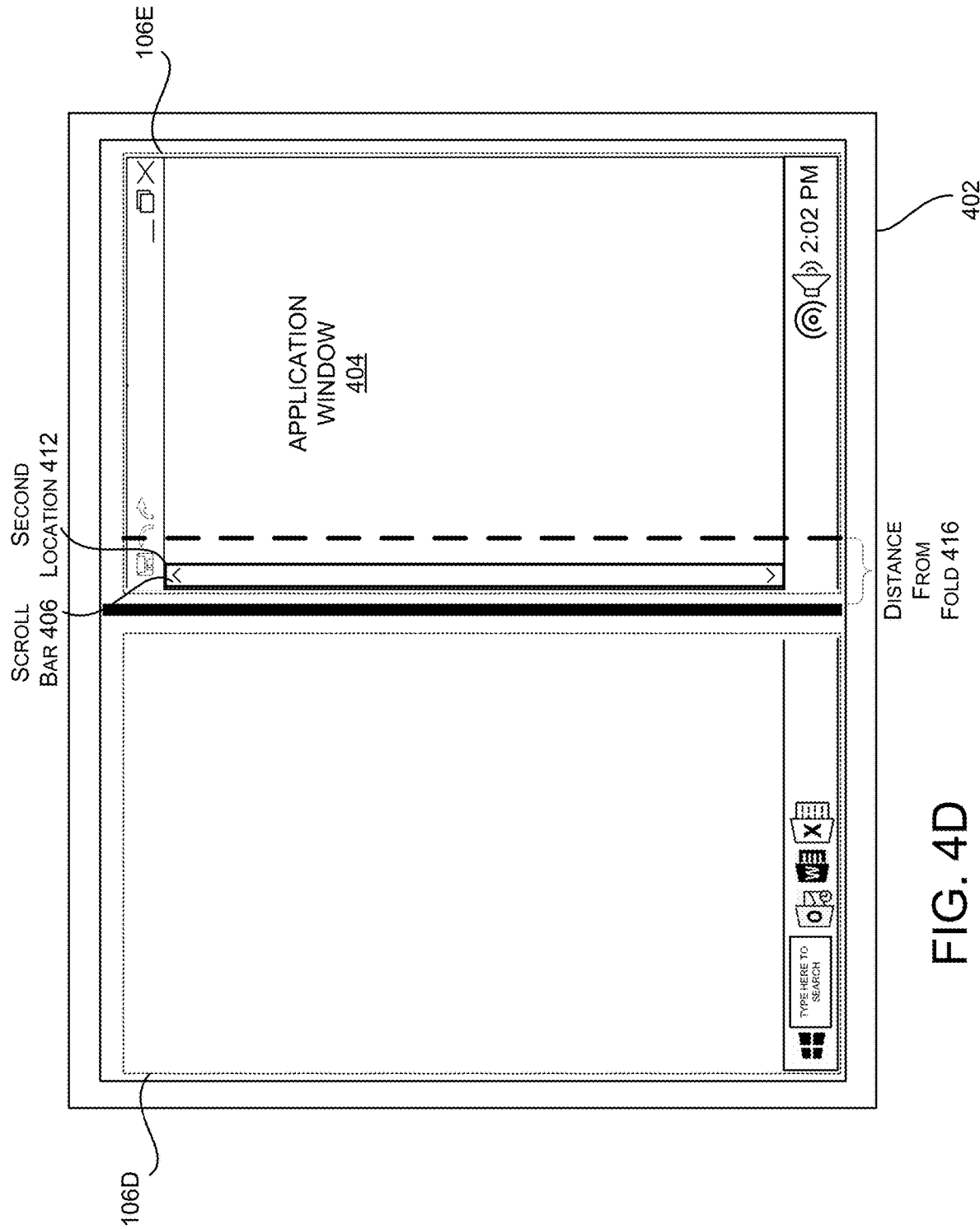
FIG. 4D is a block diagram illustrating a UI component that is within a defined distance of the fold after the application window was moved to a different display region.

FIG. 4D is a block diagram illustrating a UI component 406 that is within a defined distance 410 of the fold 304 after the application window 404 was moved to a different display region 106E. An analysis similar to the analysis discussed above with regard to FIG. 4B may be performed after the application window 404 has been moved. The foldable device may similarly compute a relocation score and compare the relocation score against a minimum threshold relocation score to determine whether to relocate the UI component 406.

Figure 4E:
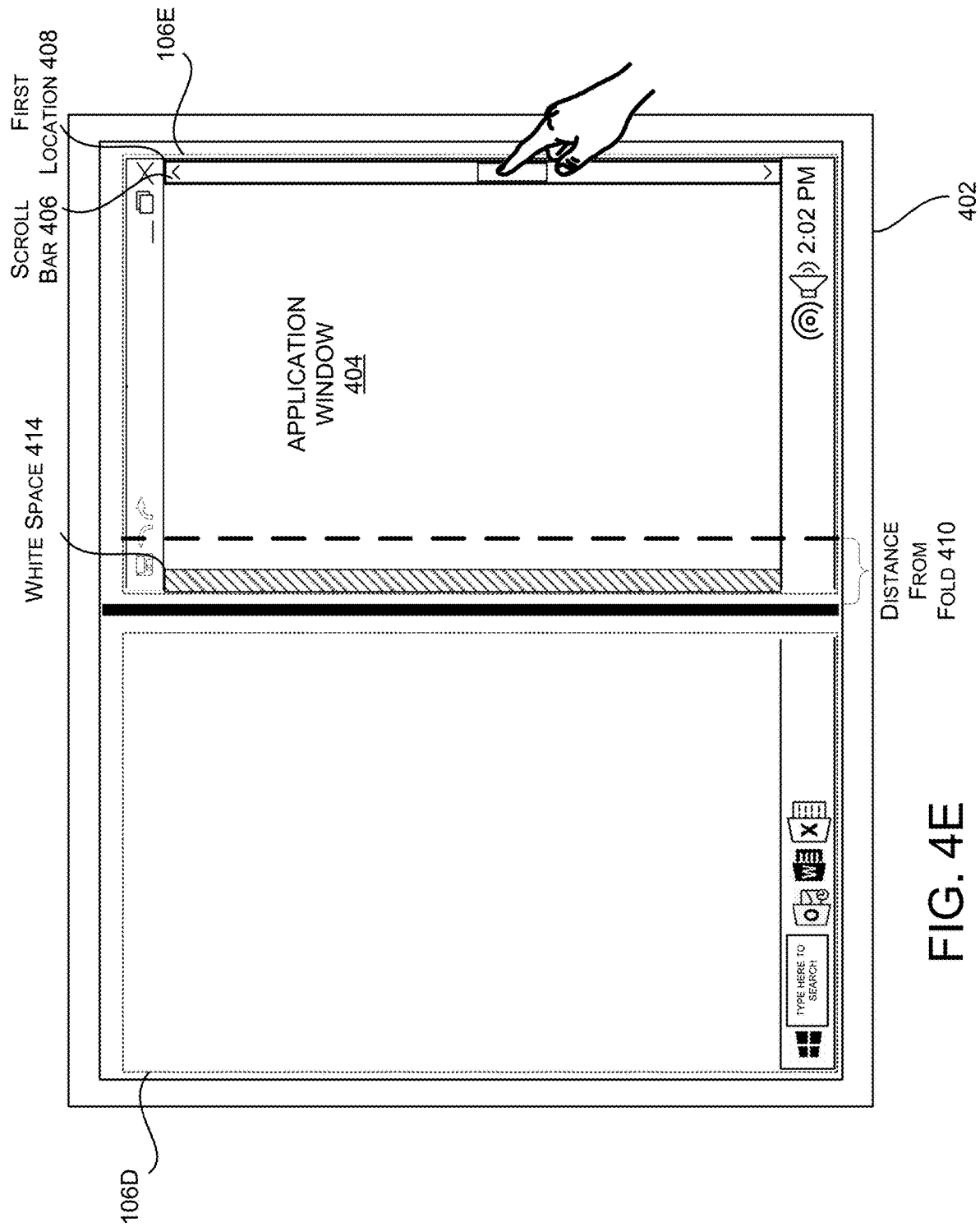
FIG. 4E is a block diagram illustrating a UI component that has been moved back to a default location.

FIG. 4E is a block diagram illustrating a UI component 406 that has been moved back to a default location 408. In some configurations, a similar analysis as described above in conjunction with FIG. 4B is performed to determine how to account for white space 414 left by moving the scroll bar 406.

Figure 4F:
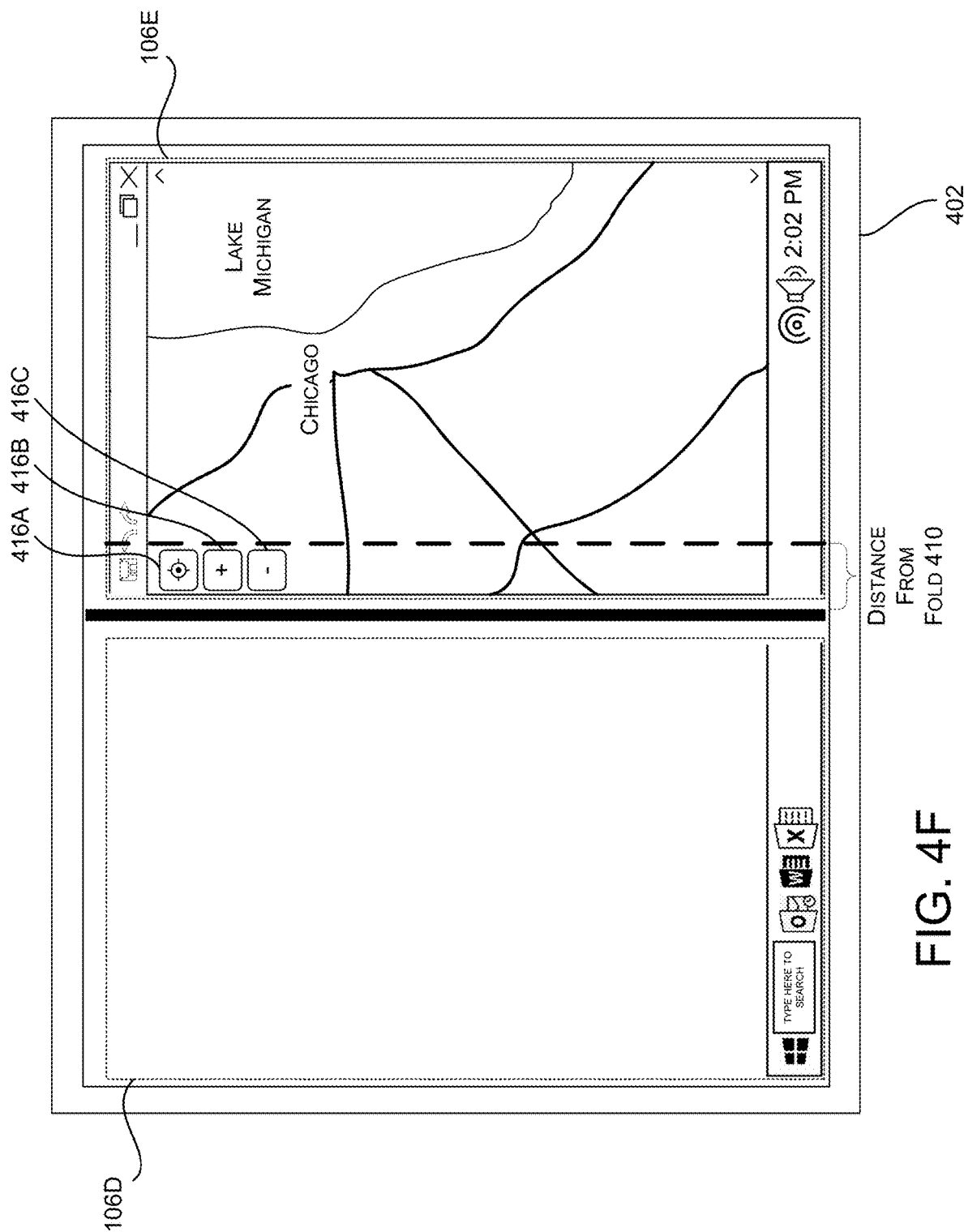
FIG. 4F is a block diagram illustrating UI components on a map application that fall within a defined distance of the fold.

FIG. 4F is a block diagram illustrating UI components 416 on a map application that fall within a defined distance of the fold 410. In this example, UI component 416A is a "center the map on my location" button, UI component 416B is a "zoom in" button, and UI component 416C is a "zoom out" button. These particular buttons are selected for example purposes, and any other shape, style, or type of button, or description thereof, are similarly contemplated. Furthermore, buttons are one type of UI component that may be relocated. Any other type of UI component is similarly contemplated, including sliders, text fields, date pickers, tabs, radio buttons, data entry fields, list boxes, comboboxes (e.g. a combination of a data entry field and a list box), etc. While UI components 416 are depicted as being located completely within the distance from fold 410, UI components may be identified as candidates to be relocated if a portion of the UI component lies within the distance from the fold 410. For example, a relocation score of a UI component may be inversely proportional to the distance of that UI component to the fold 304.

As discussed herein, the foldable device 402 may determine that a relocation score for one or more of these buttons will exceed a predetermined minimum threshold, indicating that an estimated value to a user of relocating one or more of the buttons 416 outweighs the estimated detriment to the user of relocating one or more of the buttons 416.

In some configurations, buttons that are related to one another may be relocated as a group, even if some of the buttons individually do not have relocation scores that exceed the minimum threshold. In some instances, a determination to relocate a single UI component of a group of related UI components will cause all of the related UI components to be relocated. In other configurations, the relocation scores of the related UI components may be combined, e.g. averaged, to determine whether to relocate the group of related UI components. In other configurations, only if all of the UI components of the group individually have relocation scores above the minimum threshold will the group be relocated.

UI components may be determined to be related based on a proximity to one another, e.g. falling within a cluster or other grouping. UI components may also be determined to be related based on having a shared parent control, based on performing related operations (e.g. zoom in and zoom out), based on an explicit indication from a user, etc. In some configurations, UI components that lie completely outside of the distance from the fold 410 may be relocated as part of a group of UI components that are relocated.

In some configurations, after relocating one or more UI components and shifting the remaining UI components to fill the resulting void, foldable device 402 may evaluate whether any of the shifted UI components are themselves candidates for being relocated. In this way, foldable device 402 may iteratively relocate UI components. When evaluating whether to iteratively relocate UI components, the foldable device 402 may apply the same techniques as were applied to UI components that initially were located within the distance from the fold 410. In some configurations, different thresholds may be applied when iteratively relocating UI components, e.g. increasing or decreasing the minimum relocation score, the distance from the fold 410, etc.

Figure 5B:
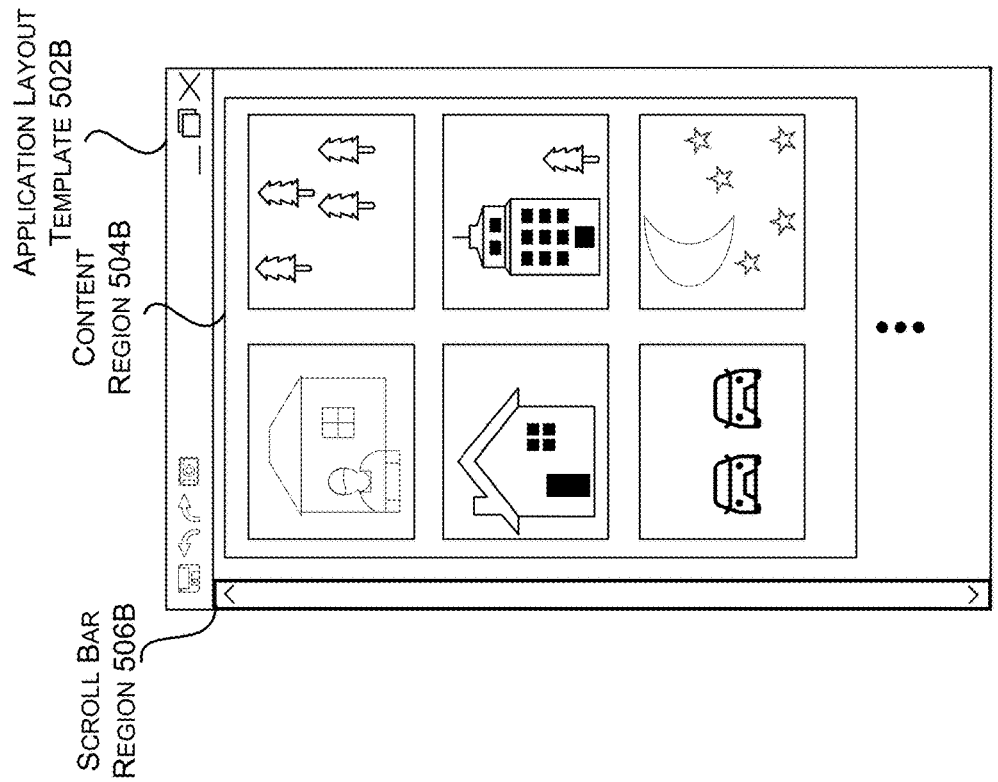
FIG. 5B is an example of a non-default layout template that defines a size and location of UI components of an application window.
Figure 5A:
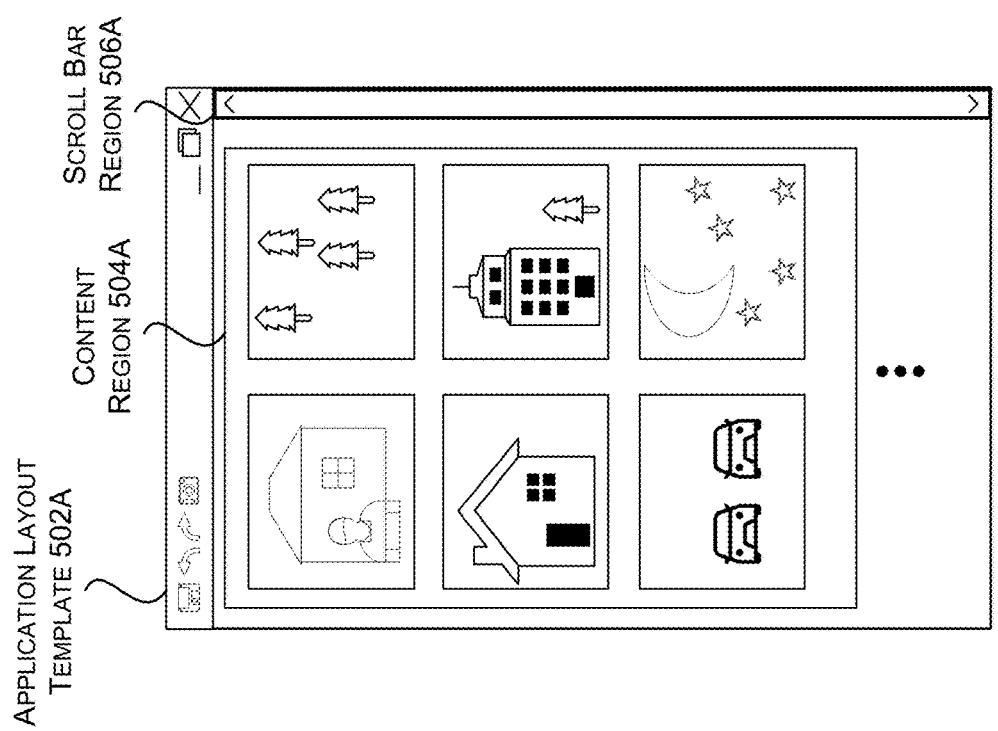
FIG. 5A is an example default layout template that defines a size and location of UI components of an application window.

FIGS. 5A-5B are examples default and backup layout templates for use by a foldable device that relocates UI components. For example, layout template 502A defines a size and location of UI components 506 of an application window. Layout template 502A may be used initially, before a relocation score is computed and applied to determine whether a UI Component should be moved. FIG. 5A illustrates how a programmer, designer, or other contributor may define a default layout of application content 504, scrollbars 506, etc. FIG. 5B illustrates a non-default or "backup" layout, which may be selected for use by the foldable device when the relocation score exceeds a default threshold.

Figure 6A:
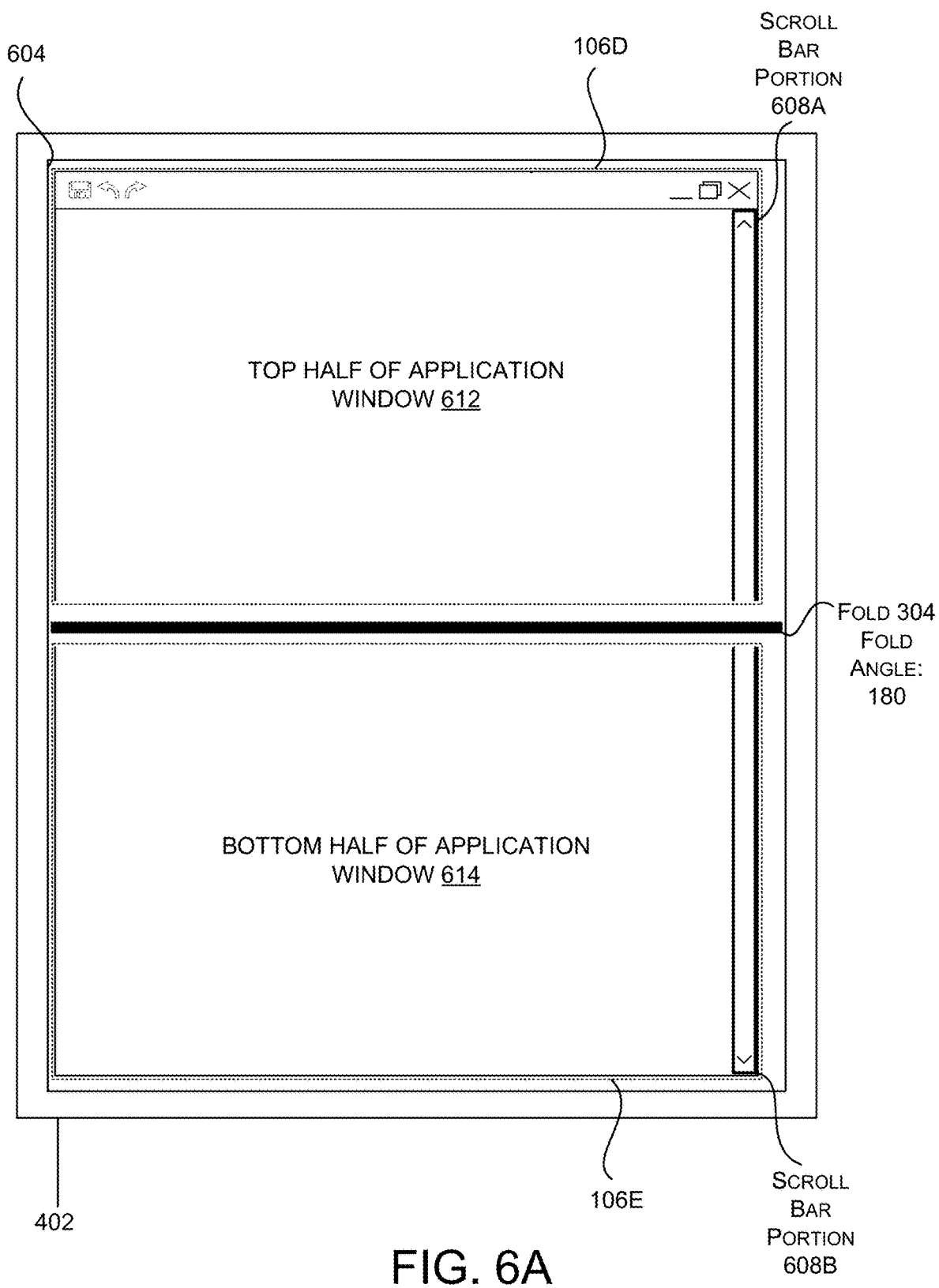
FIG. 6A illustrates a UI component that spans two display regions on a foldable device that is in a flat posture.

FIG. 6A illustrates a UI component 608 that spans two display regions 106 on a foldable device 402 that is in a flat posture. As illustrated, the UI component 608 is partially located in the top half of application window 612 and the bottom half of application window 614.

Figure 6B:
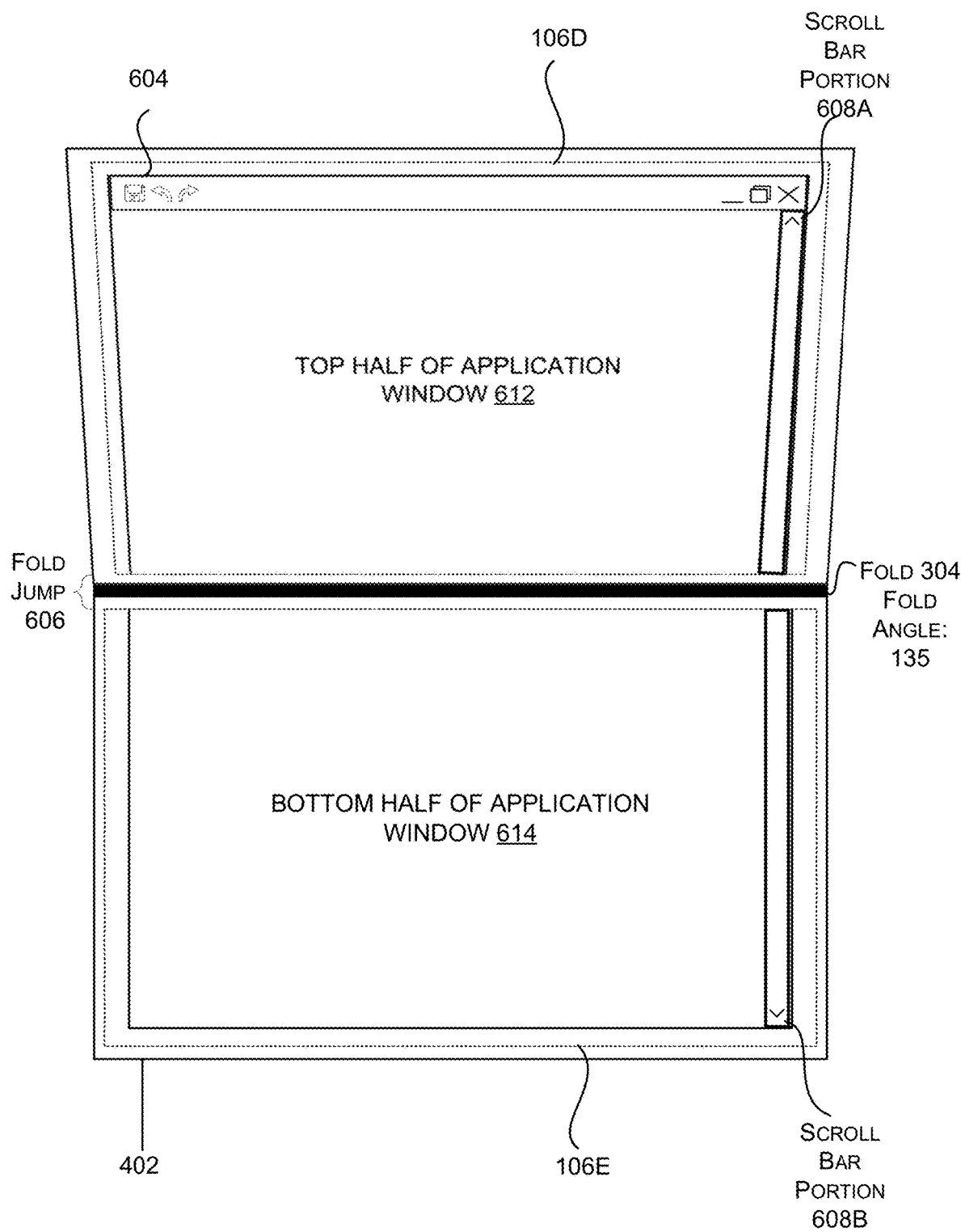
FIG. 6B illustrates a UI component that spans two display regions on a foldable device as the foldable device transitions to a "compose mode" posture.

FIG. 6B illustrates a UI component 608 that spans two display regions 106 on a foldable device 402 as the foldable device 402 transitions to a "compose mode" posture. In some embodiments, foldable device 402 transitions from a "flat" posture, having a fold angle of 180 degrees, to a "compose mode" posture, having a fold angle of 135 degrees. However, while a user may benefit from viewing content on both halves of the application window on both display regions 106, manipulating UI components that span display regions may be cumbersome and error prone.

Figure 6C:
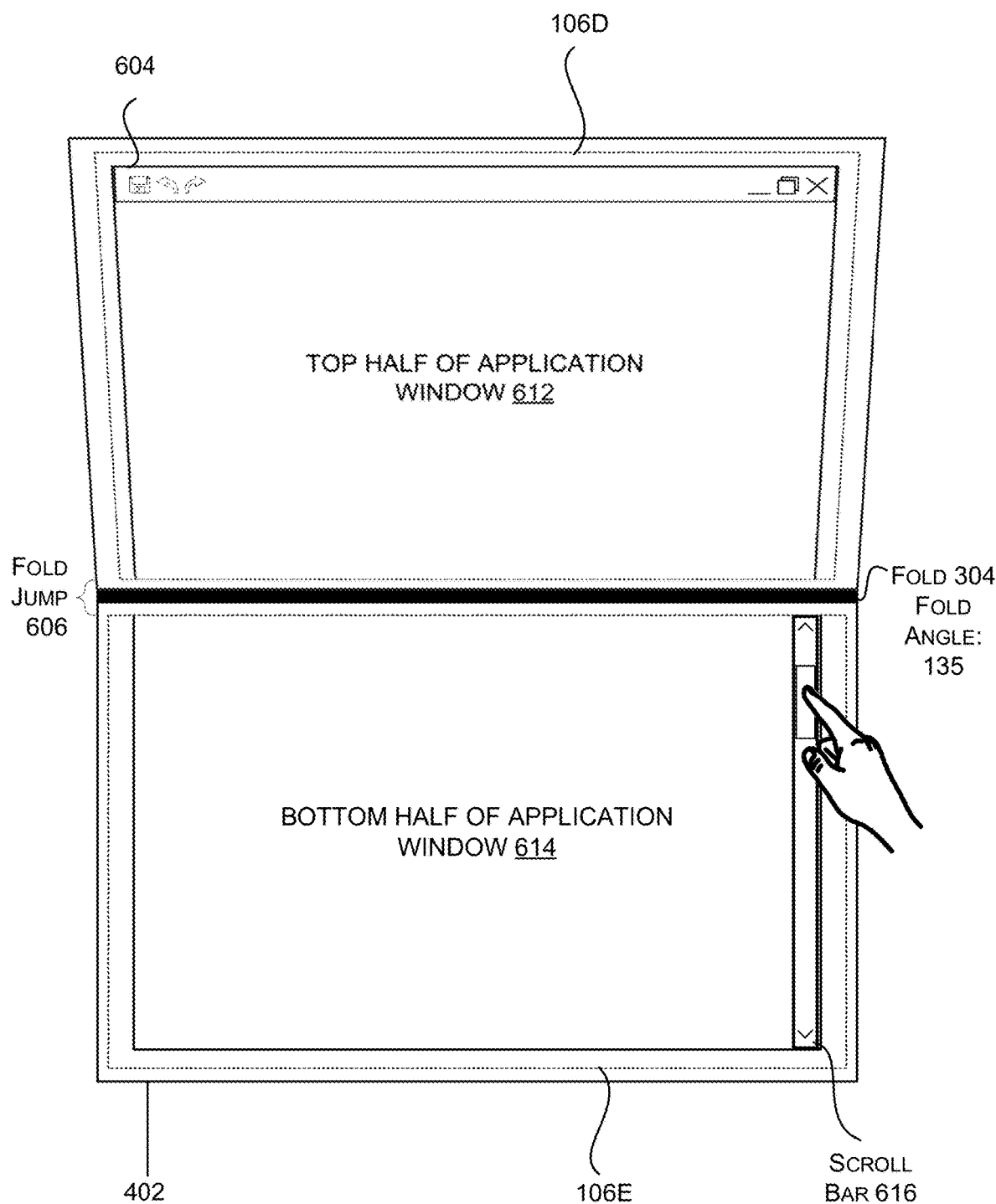
FIG. 6C illustrates a UI component having been resized and/or relocated to a single display region.

FIG. 6C illustrates a UI component 612 having been resized and/or relocated to a single display region 106E. In some configurations, the UI component 616 may be manipulated by a user to perform the same functionality as the UI component 608 that spanned both display regions. For example, scrollbar 616 may be used to scroll content in both display regions 106.

Figure 7A:
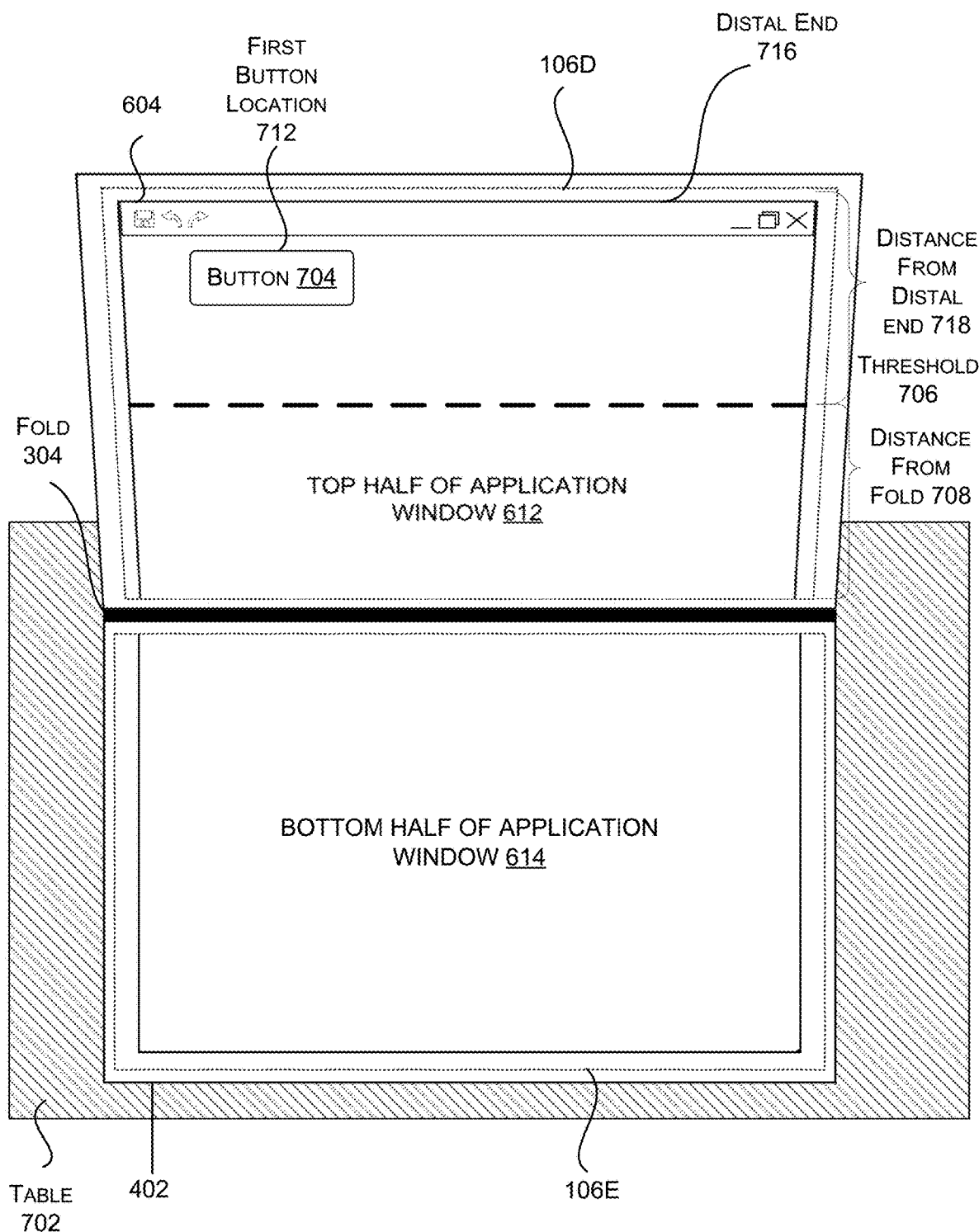
FIG. 7A illustrates a UI component near a distal end of a display region.

FIG. 7A illustrates a UI component 704 near a distal end 716 of a display region 106D. For example, the UI component 704 is located more than half the distance from the fold 304 to the distal end 716. As illustrated, foldable device 402 is resting on table 702, although any other type of surface, including a user's lap or hands, are similarly contemplated. The foldable device 402 is depicted in a "compose mode" posture, allowing a user to view content in display region 106D while receiving content (e.g. virtual keyboard input) from display region 106E.

Button 704 is depicted as being located at a first button location 712 within a defined distance 718 from the distal end 716 of the foldable device 402. At the same time, the foldable device is depicted in a "compose mode" posture. Based on this information, the foldable device 402 may determine that the region 106D is being supported by the fold 304 of the device—i.e. that no other part of region 106D is supported by table 702. As such, a user pressing button 704 may cause the foldable device 402 to tip over, or for the fold angle to unexpectedly be increased.

Figure 7B:
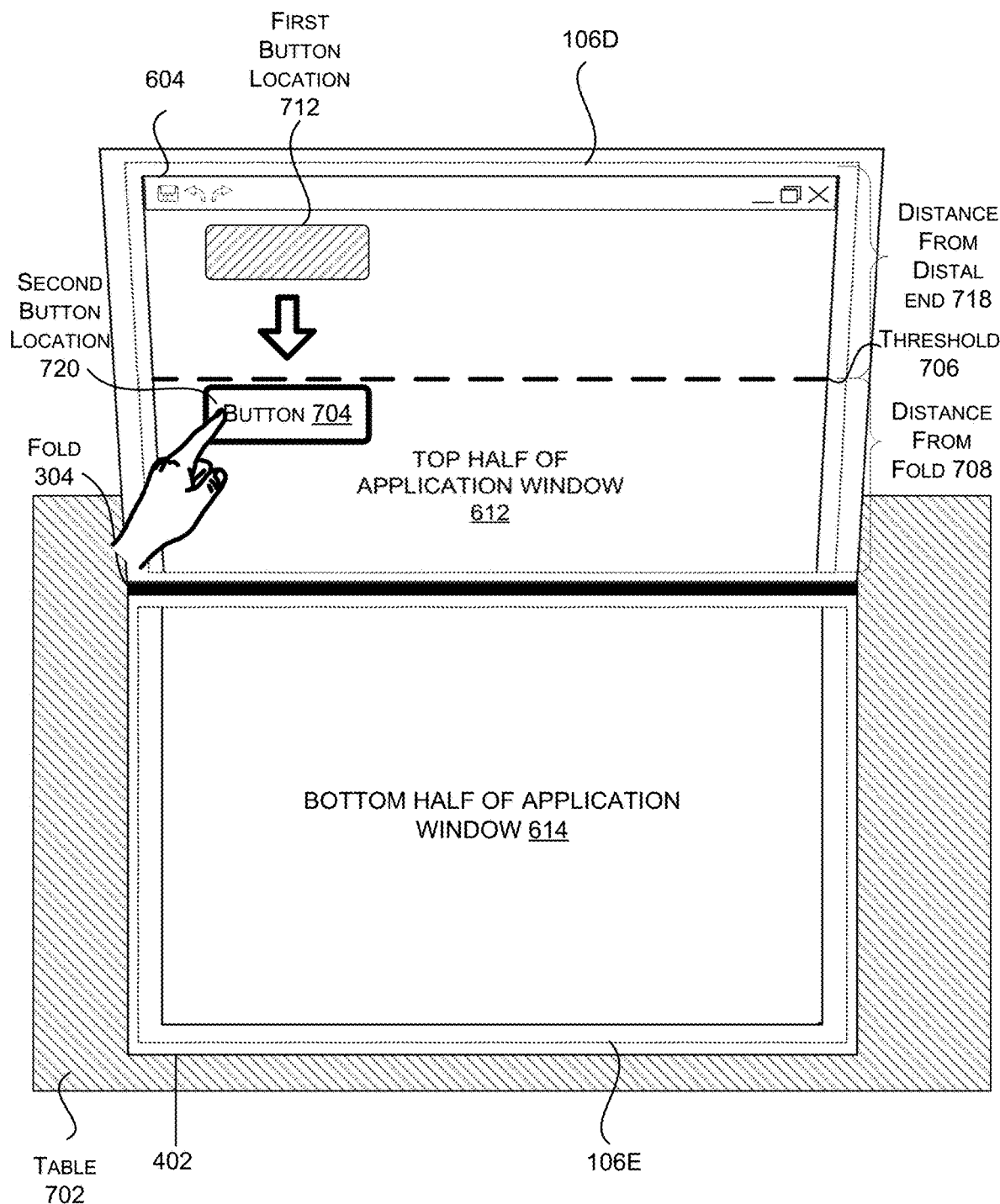
FIG. 7B illustrates a UI component having moved within a defined distance of a fold of a foldable computing device.

FIG. 7B illustrates a UI component 704 having moved to a second button location 720 within a defined distance 708 from the fold 304 of a foldable computing device. In this way, when pressed by a user, the torque (computed as "force times lever arm") applied to the display region 106D is reduced proportional by how much closer the button 704 is to the fold 304. This may reduce the chance that the foldable device 402 tips over or that the fold angle of fold 304 changes due to the button press.

Figure 8:
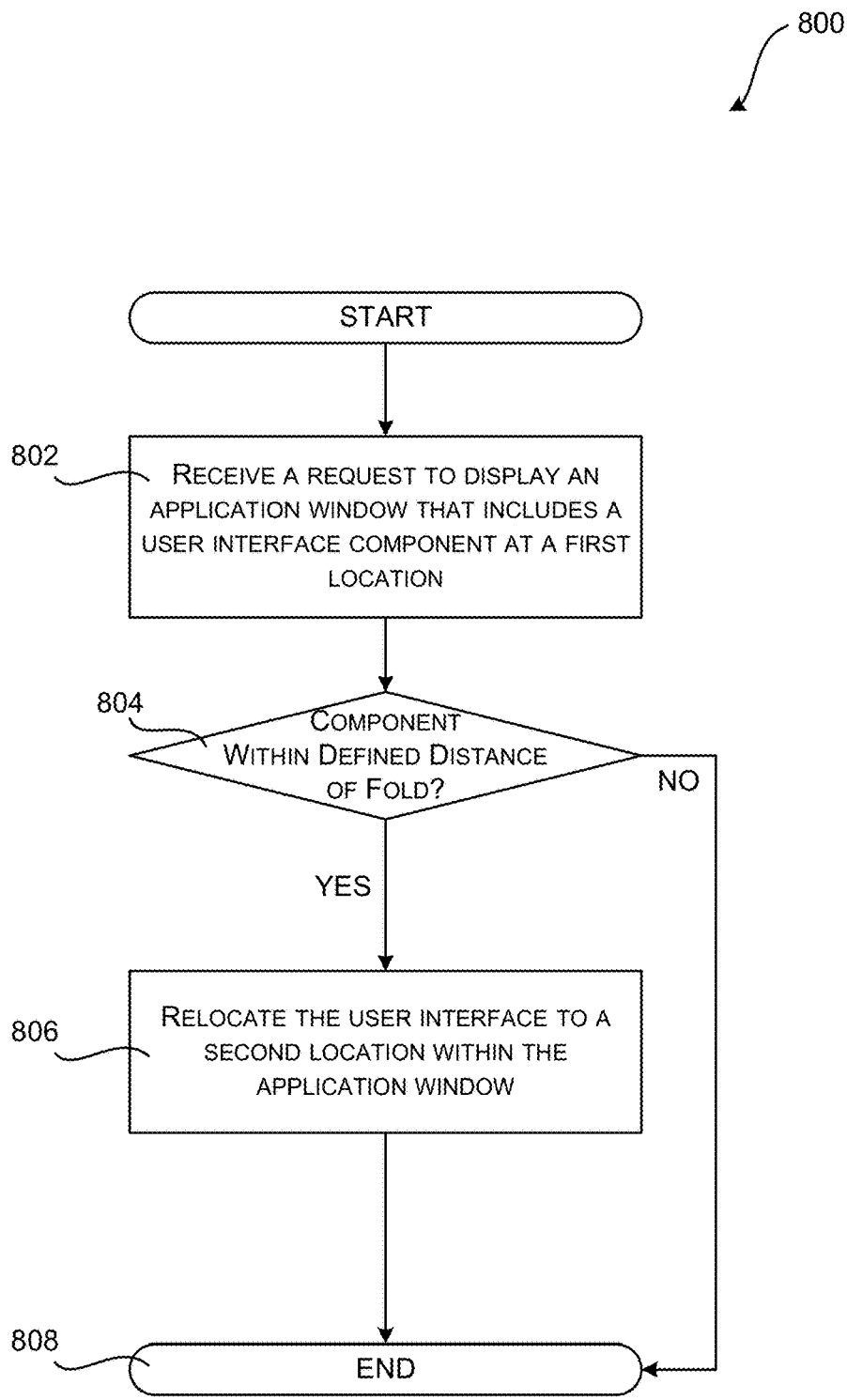
FIG. 8 is a flow diagram of an example method for relocating a UI component away from a fold of a foldable computing device.

FIG. 8 is a flow diagram 800 of an example method for relocating a UI component away from a fold of a foldable computing device. It should be appreciated that the logical operations described herein with regard to FIGS. 8-10, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 800 begins at operation 802, where foldable device 402 receives a request to display an application window 404 that includes a user interface component 406 at a first location 408 as described in detail above. The routine 800 then proceeds to operation 804, where foldable device 402 determines whether the UI component 406 is within a defined distance 410 of a fold 304 of the foldable device 402.

If the UI component 406 is within the defined distance 410 of the fold 304, the routine 800 then proceeds to operation 806, where foldable device 402 relocates the UI component 406 to a second location 412 within the application window 404. The routine 800 then proceeds from operation 806 to operation 808, where it ends.

If the UI component 406 is not within the defined distance 410 of the fold 304, then the routine 800 proceeds from operation 804 to operation 808, where it ends.

Figure 9:
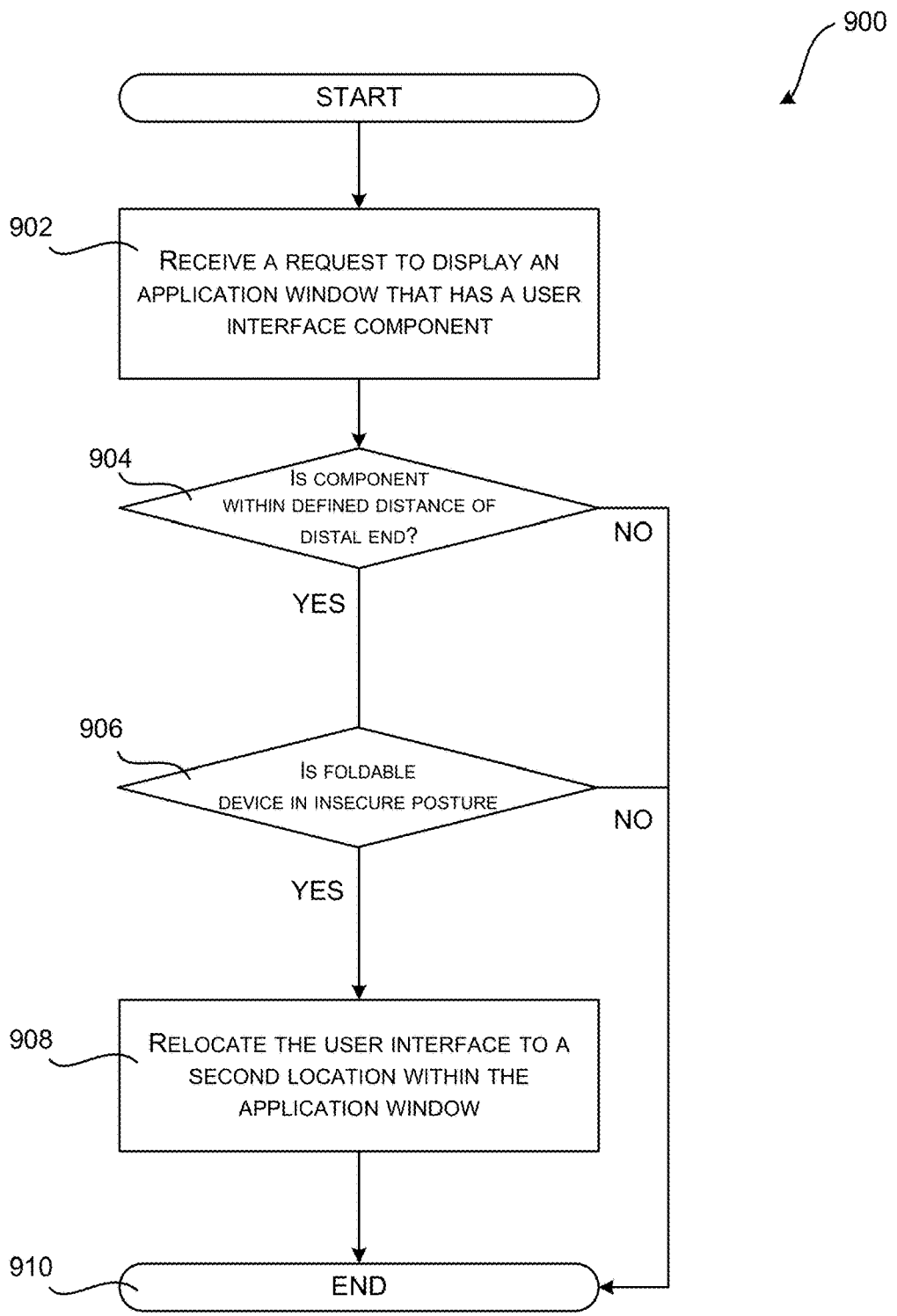
FIG. 9 is a flow diagram of an example method for relocating a UI component away from a distal end of a display region supported by a fold of a foldable computing device.

FIG. 9 is a flow diagram 900 of an example method for relocating a UI component 704 away from a distal end 716 of a display region 106D insecurely supported by a fold 304 of a foldable computing device 402.

The routine 900 begins at operation 902, where foldable device 402 receives a request to display an application window 604 that includes a user interface component 704. The routine 900 then proceeds from operation 902 to operation 904, where foldable device 402 determines whether the UI component 704 is within a defined distance 718 of the distal end 716 of the foldable device 402.

If the UI component is within the defined distance 718 of the distal end 716 of the foldable device 402, then the routine 900 then proceeds from operation 904 to operation 906, where the foldable device 402 determines whether the foldable device 402 is in an insecure posture, e.g. a posture in which a push from a user may tip over the foldable device 402 or change the fold angle. If the UI component 704 is in an insecure posture, the routine 900 then proceeds from operation 906 to operation 908, where the UI component 704 is relocated to a second location within the application window 604. For example, the UI component 704 may be moved to a location closer to the fold 304, e.g. past threshold 706. The routine 900 then proceeds from operation 908 to 910, where it ends.

If the UI component is not within the defined distance 718 of the distal end 716 of the foldable device 402, then the routine 900 proceeds from operation 904 to operation 910, where it ends. If the UI component is not in an insecure posture, then the routine 900 proceeds from operation 906 to operation 910, where it ends.

Figure 10:
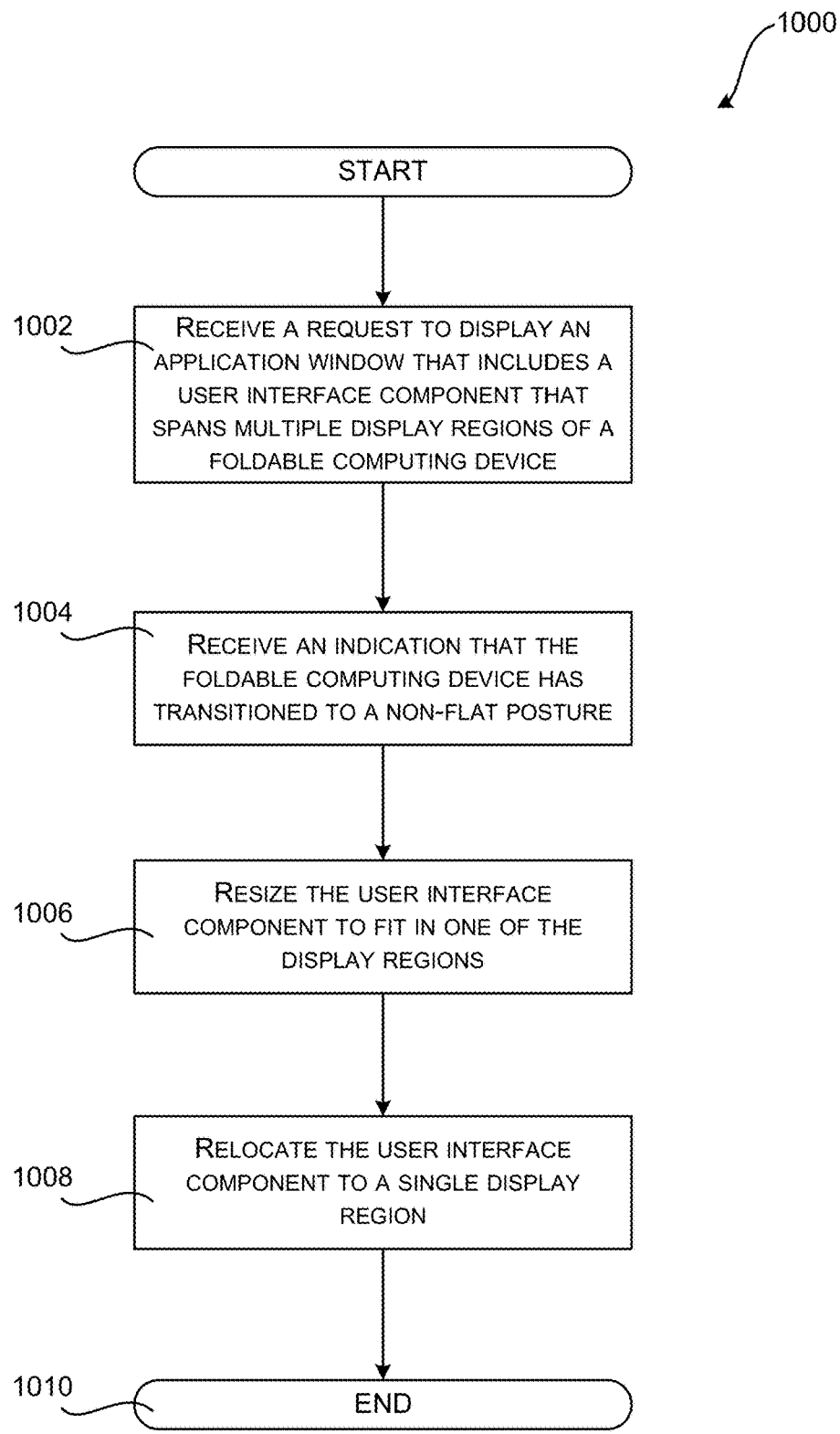
FIG. 10 is a flow diagram of an example method for resizing and/or relocating a UI component that spans multiple display regions into a single display region.

FIG. 10 is a flow diagram 1000 of an example method for resizing and/or relocating a UI component 608 that spans multiple display regions 106 into a single display region 106E.

The routine 1000 begins at operation 1002, where foldable device 402 receives a request to display an application window 604 that includes a user interface component 608 that spans multiple display regions 106 of the foldable computing device 402. The routine 1000 then proceeds from operation 1002 to operation 1004, where foldable device 402 receives an indication that the foldable computing device 402 has transitioned to a non-flat posture.

The routine then continues from operation 1004 to operation 1006, where the foldable computing device 402 resizes the UI component 608 to fit into one of the display regions 106E. The routine then continues from operation 1006 to operation 1008, where the foldable computing device 402 relocates the UI component 612 to a location within a single display region 106E.

The routine 1000 then proceeds from operation 1008 to operation 1010, where it ends.

Figure 11:
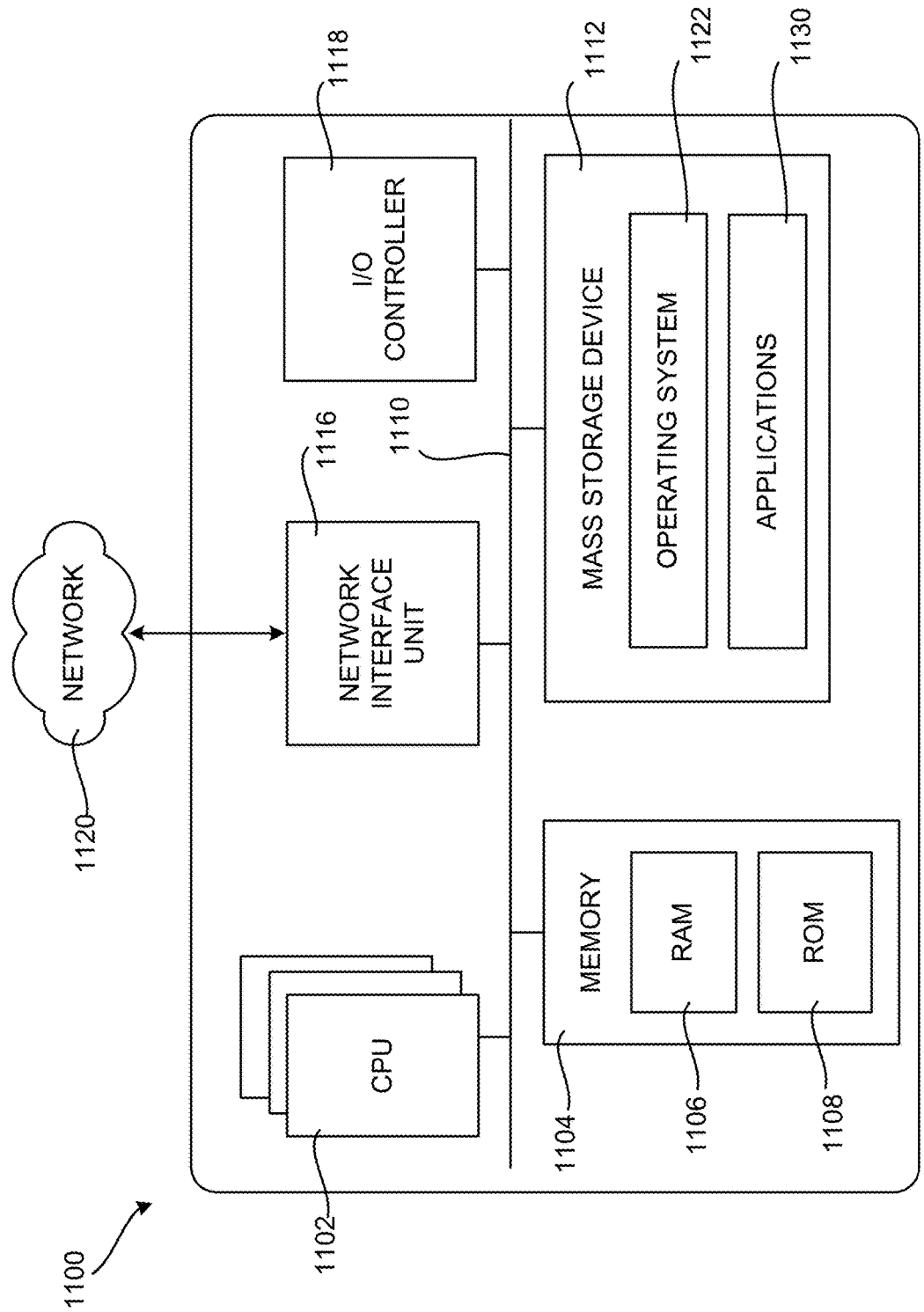
FIG. 11 is a computer architecture diagram showing an illustrative computer hardware and software architecture for a computing device that can implement aspects of the technologies presented herein.

FIG. 11 is a computer architecture diagram showing an illustrative computer hardware and software architecture for a computing device that can implement the various technologies presented herein. In particular, the architecture illustrated in FIG. 11 can be utilized to implement a multi-screen computing device, such as the hinged devices 102 and bendable devices 202 described herein. The illustrated architecture can also be utilized to implement other types of computing systems supporting multiple display regions that can be utilized to implement the disclosed technologies.

The computer 1100 illustrated in FIG. 11 includes a central processing unit 1102 ("CPU"), a system memory 1104, including a random-access memory 1106 ("RAM") and a read-only memory ("ROM") 1108, and a system bus 1110 that couples the memory 1104 to the CPU 1102. A basic input/output system ("BIOS" or "firmware") containing the basic routines that help to transfer information between elements within the computer 1100, such as during startup, can be stored in the ROM 1108.

The computer 1100 further includes a mass storage device 1112 for storing an operating system 1122, application programs 1130, and other types of programs. The functionality described above is implemented by one or more of these programs in various configurations. The mass storage device 1112 can also be configured to store other types of programs and data.

The mass storage device 1112 is connected to the CPU 1102 through a mass storage controller (not shown) connected to the bus 1110. The mass storage device 1112 and its associated computer readable media provide non-volatile storage for the computer 1100. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1100. For purposes of the claims, the phrase "computer storage medium," and variations thereof, does not include waves or signals per se or communication media.

According to various configurations, the computer 1100 can operate in a networked environment using logical connections to remote computers through a network such as the network 1120. The computer 1100 can connect to the network 1120 through a network interface unit 1116 connected to the bus 1110. It should be appreciated that the network interface unit 1116 can also be utilized to connect to other types of networks and remote computer systems. The computer 1100 can also include an input/output controller 1118 for receiving and processing input from a number of other devices, including a keyboard, mouse, touch input, a digital pen, or a physical sensor such as cameras and biometric sensors.

The computer 1100 can also be configured with a suitable video output device that can provide output to one or more display screens, such as those described above. One or more of the displays can be a touch-sensitive display that is configured to detect the presence and location of a touch. Such a display can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen is incorporated on top of a display as a transparent layer to enable a user to use one or more touches to interact with objects or other information presented on the display.

A touch-sensitive display can be configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims.

In some configurations, the computer 1100 supports a tap gesture in which a user taps a display once. A double tap gesture in which a user taps a display twice can also be supported. The double tap gesture can be used for various reasons including, but not limited to, zooming in or zooming out in stages. In some configurations, the computer 1100 supports a tap and hold gesture in which a user taps and maintains contact for at least a pre-defined time. The tap and hold gesture can be used for various reasons including, but not limited to, opening a context-specific menu.

In some configurations, the computer 1100 supports a pan gesture in which a user places a finger on a display and maintains contact with display while moving their finger. The pan gesture can be used for various reasons including, but not limited to, moving through screens, images, or menus at a controlled rate. Multiple finger pan gestures are also contemplated.

In some configurations, the computer 1100 supports a flick gesture in which a user swipes a finger in the direction the user wants the screen to move. The flick gesture can be used for various reasons including, but not limited to, scrolling horizontally or vertically through menus or pages. In some configurations, the computer 1100 supports a pinch and stretch gesture in which a user makes a pinching motion with two fingers (e.g., thumb and forefinger) or moves the two fingers apart. The pinch and stretch gesture can be used for various reasons including, but not limited to, zooming gradually in or out of a web site, map, or picture.

Although the gestures described above have been presented with reference to the use of one or more fingers for performing the gestures, other appendages such as digital pens can be used to interact with the computing device 1100. As such, the above gestures should be understood as being illustrative and should not be construed as being limiting in any way.

It should be appreciated that the software components described herein, when loaded into the CPU 1102 and executed, can transform the CPU 1102 and the overall computer 1100 from a general-purpose computing device into a special-purpose computing device customized to facilitate the functionality presented herein. The CPU 1102 can be constructed from any number of transistors or other discrete circuit elements, which can individually or collectively assume any number of states. More specifically, the CPU 1102 can operate as a finite-state machine, in response to executable instructions contained within the software modules disclosed herein. These computer-executable instructions can transform the CPU 1102 by specifying how the CPU 1102 transitions between states, thereby transforming the transistors or other discrete hardware elements constituting the CPU 1102.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1100 in order to store and execute the software components presented herein. It also should be appreciated that the architecture shown in FIG. 11 for the computer 1100, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1100 might not include all of the components shown in FIG. 11, can include other components that are not explicitly shown in FIG. 11, or can utilize an architecture completely different than that shown in FIG. 11.

It should be appreciated that the computing architecture shown in FIG. 11 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Example 1: A foldable computing device, comprising: a first display region physically connected to a second display region by a fold; one or more processing units; and a computer-readable storage medium having computer-executable instructions stored thereupon, which, when executed by the one or more processing units, cause the one or more processing units to: receive a request to display an application window in the first display region, wherein the application window includes a user interface component at a first location in the application window; determine if the user interface component is located within a defined distance of the fold; and relocate the user interface component to a second location in the application window if the user interface component is located within the defined distance of the fold.

Example 2: The foldable computing device of Example 1, wherein the computer-executable instructions further cause the one or more processing units to: calculate a relocation score for the user interface component based in part on a size of the user interface component and a complexity of a user interface gesture used to operate the user interface component; and relocate the user interface component when the relocation score exceeds a defined minimum relocation score.

Example 3: The foldable computing device of Example 2, wherein the relocation score for the user interface component is inversely proportional to the size of the user interface component, and wherein the relocation score for the user interface component is proportional to the complexity of the user interface gesture used to operate the user interface component.

Example 4: The foldable computing device of Example 2, wherein the relocation score is proportional to a frequency of use for a period of time that the user interface component has been used in the past.

Example 5: The foldable computing device of Example 2, wherein the computer-executable instructions further cause the one or more processing units to: determine a fold angle between the first display region and the second display region; and wherein the relocation score for the user interface component is inversely proportional the fold angle.

Example 6: The foldable computing device of Example 5, wherein the computer-executable instructions further cause the one or more processing units to: determine a posture of the foldable device based in part on the fold angle; decreasing the defined distance to the fold if the determined posture is a book posture; and increasing the defined distance to the fold if the determined posture is a flat posture.

Example 7: The foldable computing device of Example 6, wherein the first location of the user interface component is defined in a first layout, and wherein the second location is defined by a second layout selected based on the determined posture of the foldable device.

8. The foldable computing device of Example 7, wherein the computer-executable instructions further cause the one or more processing units to: detect a change in posture of the device to a second posture; determine if the user interface component is located within a second defined distance to the fold, wherein the second defined distance is associated with the second posture; and relocate the user interface component to a third location in the application window if the user interface component is located within the second defined distance to the fold.

Example 9: The foldable computing device of Example 1, wherein the computer-executable instructions further cause the one or more processing units to: move the application window to the second display region; re-determine if the user interface component in the second position is located within a defined distance to the fold; and relocate the user interface component to a third location in the application window if the user interface component is located within the defined distance to the fold.

Example 10: The foldable computing device of Example 9, wherein the third location comprises the first location.

Example 11: The foldable computing device of Example 1, wherein the user interface component comprises a scrollbar.

Example 12: A method comprising: receiving a request to display an application window on a foldable computing device, wherein the foldable computing device comprises a first display region connected to a second display region by a fold, wherein the application window is requested to be located at least in part in the second display region, and wherein the application window comprises a user interface component at a first location in the application window; determining that the user interface component is located within a defined distance of a distal end of the second display region; determining that the foldable computing device is supported on a surface by the first display region; and relocating the user interface component to a second location in the application window based on the determination that the user interface component is located within the defined distance to the distal end of the second display region and based on the determination that the foldable computing device is supported on the surface by the first display region.

Example 13: The method of Example 12, wherein the foldable device comprises a hinged device and wherein the fold comprises a hinge.

Example 14: The method of Example 12, wherein the foldable device comprises a bendable device and wherein the fold comprises a crease.

Example 15: The method of Example 12, wherein the second location is in the first display region.

Example 16: The method of Example 12, wherein the second location is within a defined distance of the fold.

Example 17: A system comprising: one or more processing units; and a computer-readable storage medium having computer-executable instructions stored thereupon, which, when executed by the one or more processing units, cause the one or more processing units to: receive a request to display an application window at least in part in a first display region and at least in part in a second display region of a foldable computing device, wherein the application window includes a user interface component that is located at least in part in the first display region and at least in part in the second display region; determine that the foldable computing device is in a posture other than a flat posture; in response to determining that the foldable computing device is in a posture other than a flat posture: resize the user interface component to fit in the first display region; and relocate the user interface component to the first display region.

Example 18: The system of Example 17, wherein the user interface component is resized and relocated in response to a determination that the foldable computing device has transitioned from a flat posture to a non-flat posture.

Example 19: The system of Example 17, wherein the user interface component comprises a scroll bar.

Example 20: The system of Example 19, wherein the computer-executable instructions further cause the one or more processing units to: receive an indication of a user interaction with the scroll bar; and in response to the indication of the user interaction with the scroll bar, scrolling the application window across the first display region and the second display region.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resources, two different users, two different operations, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A foldable computing device, comprising:
   a first display region physically connected to a second display region by a fold;
   one or more processing units; and
   a computer-readable storage medium having computer-executable instructions stored thereupon, which, when executed by the one or more processing units, cause the one or more processing units to:
   receive a request to display an application window in the first display region, wherein the application window includes a user interface component at a first location in the application window;
   determine that the user interface component is located within a defined distance of the fold;
   calculate a relocation score for the user interface component based in part on a size of the user interface component and a complexity of a user interface gesture used to operate the user interface component; and
   relocate the user interface component to a second location in the application window based on the determination that the user interface component is located within the defined distance of the fold and when the relocation score exceeds a defined minimum relocation score.

2. The foldable computing device of claim 1, wherein the relocation score for the user interface component is inversely proportional to the size of the user interface component, and wherein the relocation score for the user interface component is proportional to the complexity of the user interface gesture used to operate the user interface component.

3. The foldable computing device of claim 1, wherein the relocation score is proportional to a frequency of use for a period of time that the user interface component has been used in the past.

4. The foldable computing device of claim 1, wherein the computer-executable instructions further cause the one or more processing units to determine a fold angle between the first display region and the second display region, wherein the relocation score for the user interface component is inversely proportional to the fold angle.

5. The foldable computing device of claim 4, wherein the computer-executable instructions further cause the one or more processing units to:
   determine a posture of the foldable computing device based in part on the fold angle;
   decreasing the defined distance to the fold if the determined posture is a book posture; and
   increasing the defined distance to the fold if the determined posture is a flat posture.

6. The foldable computing device of claim 5, wherein the first location is defined in a first layout, and wherein the second location is defined in a second layout selected based on the determined posture of the foldable computing device.

7. The foldable computing device of claim 6, wherein the computer-executable instructions further cause the one or more processing units to:
   detect a change in posture of the foldable computing device to a second posture;
   determine if the user interface component is located within a second defined distance to the fold, wherein the second defined distance is associated with the second posture; and
   relocate the user interface component to a third location in the application window if the user interface component is located within the second defined distance to the fold.

8. The foldable computing device of claim 1, wherein the computer-executable instructions further cause the one or more processing units to:
   move the application window to the second display region;
   re-determine if the user interface component in the second position display region is located within the defined distance of the fold; and
   relocate the user interface component to a third location in the application window if the user interface component is located within the defined distance of the fold.

9. The foldable computing device of claim 8, wherein the third location comprises the first location.

10. The foldable computing device of claim 1, wherein the user interface component comprises a scrollbar.

11. A method comprising:
   receiving a request to display an application window on a foldable computing device, wherein the foldable computing device comprises a first display region connected to a second display region by a fold, wherein the application window is requested to be located at least in part in the second display region, and wherein the application window comprises a user interface component at a first location in the application window;
   determining that the first location is within a defined distance of a distal end of the second display region;
   determining that the foldable computing device is supported on a surface by the first display region; and
   relocating the user interface component from the first location to a second location that is closer to the fold, when compared to the first location, based on the determination that the first location is within the defined distance of the distal end of the second display region and based on the determination that the foldable computing device is supported on the surface by the first display region.

12. The method of claim 11, wherein the foldable computing device comprises a hinged device and wherein the fold comprises a hinge.

13. The method of claim 11, wherein the foldable computing device comprises a bendable device and wherein the fold comprises a crease.

14. The method of claim 11, wherein the second location is in the first display region.

15. The method of claim 11, wherein the second location is within a defined distance of the fold.

16. A system comprising:
   one or more processing units; and
   a computer-readable storage medium having computer-executable instructions stored thereupon, which, when executed by the one or more processing units, cause the one or more processing units to:
      receive a request to display an application window at least in part in a first display region and at least in part in a second display region of a foldable computing device, wherein the application window includes a user interface component that is located at least in part in the first display region and at least in part in the second display region;
      determine that the foldable computing device is in a posture other than a flat posture;
      in response to determining that the foldable computing device is in the posture other than the flat posture:
         resize the user interface component to fit in the first display region; and
         relocate the user interface component so that the user interface component is only displayed in the first display region while the application window continues to be displayed at least in part in the first display region and at least in part in the second display region.

17. The system of claim 16, wherein the user interface component is resized and relocated in response to a determination that the foldable computing device has transitioned from a flat posture to a non-flat posture.

18. The system of claim 16, wherein the user interface component comprises a scroll bar.

19. The system of claim 18, wherein the computer-executable instructions further cause the one or more processing units to:
   receive an indication of a user interaction with the scroll bar; and
   in response to the indication of the user interaction with the scroll bar, scrolling the application window across the first display region and the second display region.

* * * * *